United States Patent [19]
Eguchi et al.

[11] Patent Number: 5,737,338
[45] Date of Patent: Apr. 7, 1998

[54] ATM EXCHANGE AND METHOD OF TESTING SAME

[75] Inventors: Nobuhiko Eguchi; Hiroyuki Kudou; Kazumasa Sonoda, all of Fukuoka; Naoki Aihara, Kawasaki, all of Japan

[73] Assignee: Fujitsu Limited, Kanagawa, Japan

[21] Appl. No.: 510,181

[22] Filed: Aug. 2, 1995

Related U.S. Application Data

[63] Continuation of Ser. No. 193,693, Feb. 8, 1994, abandoned.

[30] Foreign Application Priority Data

Jul. 19, 1993 [JP] Japan .................................. 5-177822

[51] Int. Cl.$^6$ ............................................... H04L 12/56
[52] U.S. Cl. ............................................ 371/20.5; 370/249
[58] Field of Search ............................... 370/13, 13.1, 14, 370/15, 16, 16.1, 17, 60.1, 94.1, 219, 249, 399; 371/20.5

[56] References Cited

U.S. PATENT DOCUMENTS

| | | | |
|---|---|---|---|
| 4,631,719 | 12/1986 | Huffman | 370/15 |
| 5,081,619 | 1/1992 | Nagata | 370/13 |
| 5,166,926 | 11/1992 | Cisneros | 370/60 |
| 5,239,537 | 8/1993 | Sakauchi | 370/16 |
| 5,251,204 | 10/1993 | Izawa et al. | 370/15 |
| 5,274,641 | 12/1993 | Shobatake et al. | 370/94.1 |
| 5,285,441 | 2/1994 | Bansal | 370/16 |
| 5,301,184 | 4/1994 | Uriu | 370/16 |
| 5,301,207 | 4/1994 | Emerson et al. | 375/10 |
| 5,313,453 | 5/1994 | Uchida | 370/13 |
| 5,335,232 | 8/1994 | Suzuki et al. | 371/20.4 |
| 5,487,073 | 1/1996 | Urien | 371/20.6 |

OTHER PUBLICATIONS

Phoenix: A Building Block for Fault Tolerant Brandband Packet Switches; Vijay P. Kumar, Kneuer, Pal, Brunner; 1991 IEEE; Globe Com '91:0228–0233.

*Primary Examiner*—Jack B. Harvey
*Assistant Examiner*—Paul R. Myers
*Attorney, Agent, or Firm*—Helfgott & Karas, P.C.

[57] ABSTRACT

A method of testing an ATM exchange having a redundant structure that includes an active system and a standby system includes the steps of transmitting a test cell from a testing device to both the active system and standby system, causing the test cell to pass through ATM switches in each of the active and standby systems, returning the test cell that has passed through the ATM switches of both systems to the testing device, and conducting a test of the ACT switches in the active and standby systems by comparing data contained in the transmitted test cell with data contained in a test cell received from the active system or standby system.

3 Claims, 23 Drawing Sheets

FIG. 8

| VPI/VCI OF INPUT CELL | VPI/VCI | TAG INFORMATION | ENABLE/DISABLE |
|---|---|---|---|
| | | | |
| | | | |
| ------ | ------ | ----- | ----- |

FIG. 12

ATM EXCHANGE AND METHOD OF TESTING SAME

This is a continuation of application Ser. No. 08/193,693, filed Feb. 8, 1994 now abandoned.

BACKGROUND OF THE INVENTION

This invention relates to an ATM exchange and a method of testing the same. More particularly, the invention relates to an ATM exchange possessing a construction in which ATM switches and common shelf portions have a redundant structure, as well as to a method of testing the ATM exchange.

There is increasing demand not only for audio communication and data communication but also for multimedia communication in which moving pictures are transmitted as well as audio and data. B-ISDN (broadband-ISDN) switching technology, which is based upon an asynchronous transfer mode (ATM), has been agreed upon by the CCITT as a means of realizing broadband communication for multimedia communication. Such technology is being put into practical use.

In an ATM system, logical links are multiplexed on a physical line so that a line may be allocated to a plurality of calls. Moving-picture data or audio data from a terminal corresponding to each call is broken down into fixed-length information units (referred to as "cells"), and the cells are transmitted over a line sequentially to realize multiplexing. As shown in FIG. 17, a cell is composed of a fixed-length block of 53 bytes of which five bytes constitute a header HD and 48 bytes an information field DT. In order that the destination will be understood even after data is broken down into blocks, the header HD includes a virtual channel identifier (VCI) for call identifying purposes. The header HD further includes a virtual path identifier (VPI) that identifies paths, a generic flow control (GFC) used in flow control between links, payload type (PT) and a head error control (HEC), which is a code for correcting errors in the header.

FIG. 18 is a diagram showing the configuration of an ATM network useful in describing an ATM system. Shown in FIG. 18 are terminals 1a, 1b and an ATM network 3. The ATM network 3 has an information network 3a that transmits data cells and a signal network 3b that transmits control signals. Call processing processors (CPU) 3d-1~3d-n of ATM exchanges 3c-1~3c-n in the information network 3a are connected to the signal network 3b.

When a call operation is performed so that the terminal 1a, which is on the originating side, may call the terminal 1b, which is on the terminating side, a cell assembler within the originating terminal 1a partitions data, which includes calling party number, called party number and the kind of the original terminal, as well as attributes, into cell units, attaches a signal VCI (determined in advance for each terminal) to each item of partitioned data to form a signal cell and sends the signal cells to the ATM network 3.

If a signaling device (not shown) of the ATM exchange (on the originating side) 3c-1 receives a signal cell, the signaling device assembles the information contained in the signal cells and notifies the CPU 3d-1 of the information. The CPU executes such call processing as processing for analyzing the service registered to calling-party, charging processing and processing for interpreting digits consisted in the called party number, decides a virtual path (VPI) and call identifying information (VCI) and, in accordance with a No. 7 protocol, sends the next relay exchange 3c-2 connection information, such as the calling party number, called party number, VPI, VCI and other data, via the signal network 3b. The relay exchange 3c-2 executes processing similar to that of the originating exchange 3c-1. Thereafter, processing similar to that described is performed from exchange to exchange until finally a path from the originating exchange 3c-1 to the ATM exchange (the exchange on the terminating side) 3c-n, to which the terminating terminal is connected, is decided as well as the relay ATM exchanges 3c-2, 3c-3 . . . . If the terminating exchange 3c-n receives connection information containing the calling party number, the called party number and the VCI of the higher-order ATM exchange 3c-3, then the exchange 3c-n assigns a prescribed VCI to the terminating terminal 1b and it is determined whether the terminating terminal 1b is capable of communicating. If communication is possible, then the signal network 3b notifies the originating exchange 3c-1 of the fact that communication is possible and the originating exchange assigns a prescribed VCI to the originating terminal 1a.

Each of the ATM exchanges 3c-1~3c-n on the paths registers the following, for each path, in an internal routing table in a form correlated with the VCI of the higher-order ATM exchange: (1) connection information (referred to as routing information or tag information) for specifying the output path (outgoing highway) of the cell having the particular VCI, and (2) a new VCI and new VPI, which are added on to the outputted cell.

Thus, when a path is formed between the originating terminal 1a and the terminating terminal 1b, the two terminals send and receive call and answer cells and verify the communication procedure in mutual fashion. Thereafter, the originating terminal 1a breaks down data to be transmitted into prescribed byte lengths, adds on a header containing the allocated VCI to produce a cell and sends the cell to the ATM network 3. When each of the ATM exchanges 3c-1~3c-n is supplied with an input cell from the higher-order exchange via the prescribed incoming highway, the ATM exchange refers to its own routing table to replace the VPI/VCI of the inputted cell and sends the cell out on the prescribed outgoing highway based upon the tag information. As a result, the cell outputted by the originating terminal 1a arrives at the terminating exchange 3c-n via the path that has been decided by call control. The terminating terminal 3c-n refers to its routing table, changes the VCI attached to the inputted cell to the VCI allocated to the terminating terminal and then sends the cell to the line to which the terminating terminal 11b is connected.

Thereafter, the originating terminal 1a sends cells to the terminating terminal 1b in successive fashion and the terminating terminal 1b assembles the information field DT contained in the received cells, thereby restoring the original data.

The foregoing relates to a case for dealing with one call. However, by changing the mutually held VCI values at both ends of each line between the terminal and ATM exchange and between the mutually adjacent ATM exchanges, logical links conforming to a number of calls can be established on one line. As a result, high-speed multiplexed communication may be realized. In accordance with an ATM system, information from information sources such as moving pictures, data and audio having different transmission rates can be multiplexed. As a consequence, a single transmission line can be used in a very effective manner. Moreover, re-transmission control and complicated communication procedures such as implemented by software through packet switching are no longer necessary and it is possible to achieve ultra-high-speed data transmission on the order of 150 Mbps.

A loop-back continuity test has been proposed in order to test and measure the switch function of an ATM exchange. FIG. 19 is a block diagram illustrating the construction of an ATM exchange useful in describing the loop-back continuity test. Here ATM switches in two stages are arranged in cascade. Specifically, a first ATM switch $3_1$ routes cells from the terminal side (the IN direction) and a second ATM switch $3_2$ routes cells to the terminal side (the OUT direction). A network controller $3_3$ executes call processing control, testing control and the like, an interface $3_4$ provides the interfacing between hardware and software, and a testing device $3_5$ performs a continuity test by generating a test cell and receiving a test cell that has arrived via the component undergoing the test. Numerals $3_{61}$, $3_{62}$ . . . , $3_{71}$, $3_{72}$ . . . denote line interfaces, numerals $3_{81}$, $3_{82}$, $3_9$ . . . denote common shelf portions for performing loop-back control and routing control (control for replacing the VPI/VCI and for adding on tag information), and numerals $3_{10}$, $3_{11}$ denote VPI/VCI converters (VCC).

By way of example, a user cell enters the common shelf portion $3_{81}$ via the line interface $3_{61}$. The shelf common portion $3_{81}$ changes the VPI/VCI of the cell, adds on the tag information (routing information) and then inputs the cell to the ATM switch $3_1$ for the IN direction. The ATM switch $3_1$ routes the user cell based upon the tag information so as to input the cell to the common shelf portion $3_9$. The shelf common portion $3_9$ causes the user cell to loop back and enter the ATM switch $3_2$ for the OUT direction. The ATM switch $3_2$ for the OUT direction switches the user cell on the basis of the tag information and outputs the cell via the common shelf portion $3_{82}$ and line interface $3_{71}$.

When the loop-back test is carried out, a maintenance console (not shown) is used to set the VPI/VCI values (the test route), the content of the cell and the number of test cells generated and to start the test. When this is done, the network controller $3_3$ enters this information in the testing device $3_5$. The latter generates test data composed of a random pattern, places the test data in the information field and places the entered VPI/VCI, etc., in the header to generate and output the test cell. The VPI/VCI converter $3_{11}$ adds on tag information (routing information) so as to route the test cell to the common shelf portion $3_{81}$. The ATM switch $3_2$ routes the test cell to the common shelf portion $3_{81}$ on the basis of the tag information. The common shelf portion $3_{81}$ replaces the VPI/VCI of the test cell and adds on the tag information so that the test cell will pass through the test route. The IN-direction ATM switch $3_1$, which is the component to be tested, routes the test cell on the basis of the tag information and returns the test cell to the testing device $3_5$ via the common shelf portion $3_9$ and ATM switch $3_2$. The testing device $3_5$ compares the test data contained in the test cell that is transmitted with the contents of information field contained in the test cell sent back to it through the aforementioned loop and determines whether a failure has occurred or not depending upon whether the comparison indicates agreement or non-agreement. More specifically, the test cell issued by the testing device is looped back by test-cell loop-back means so as to be introduced to the test route, and the arriving cell is inspected by the testing device, thereby verifying continuity of the test route within the ATM channel (see Japanese Patent Application Laid-Open Nos. 4-124936 and 4-207544).

Accordingly, a route in which a failure has occurred can be specified by successively changing the test route (the VPI/VCI), and the results of the test are displayed on a display unit of the maintenance console via the network controller $3_3$.

There are cases in which a redundant arrangement having an active system (ACT system) and a standby system (SBY system) is adopted for an ATM exchange in order to improve reliability. In accordance with an ATM exchange having a redundant arrangement, continuous service is possible by switching over to the standby system if the active system fails.

FIG. 20 is a diagram showing the construction of an ATM exchange having redundancy.

The ATM exchange has a frame FRM divided into a plurality of shelves, as shown in FIG. 21, and a printed circuit board is mounted on each shelf. The shelves include a shelf ATM DS1 (ADS1SH) on which a printed circuit board for line termination is mounted, a subscriber interface shelf (SIFSH) for interfacing a line and an ATM switch, a shelf (ATSWSH) on which a printed circuit board for the ATM switch is mounted, a shelf (TCGSH) on which a printed circuit board for the testing device is mounted, and a shelf (BSGCSH) on which a printed circuit board (BSGCSH) for channel equipment is mounted.

In FIG. 20, numerals $11_1$, $11_2$ denote redundant ATM switches one of which constitutes an active system (ACT system or system 0) #0 and the other of which constitutes a standby system (SBY system or system 1) #1. The ATM switches $11_1$, $11_2$ of the ACT and SBY systems have a first ATM switch from the terminal side (the IN direction) and a second switch to the terminal side (the OUT direction), though these first and second ATM switches are not shown. Numerals 12, 12' . . . denote interface units each of which terminates a 1.5M subscriber. These are mounted on the shelf ADS1SH. The interface units 12 and 12' respectively include line terminating circuits (DS-1) 12a and 12a' for converting data from the 1.5M subscriber into ATM cells and restoring ATM cells from the ATM switch to subscriber data, and redundant common shelf portions $12b_1$, $12b_2$ and $12b_1$', $12b_2$' for multiplexing and demultiplexing cells. Though only one each of the line terminating circuits 12a, 12a' is shown, four of these circuits are connected to each one of the common shelf portions $12b_1$, $12b_2$, $12b_1$', $12b_2$', by way of example. Subscribers accommodated by the line terminating circuits 12a, 12a' are a 1.5M frame relay (FR) and an SMDS subscriber line. The common shelf portions $12b_1$, $12b_2$ and $12b_1$', $12b_2$' multiplex the cells outputted by each of the line terminating circuits 12a and 12a', respectively, output the multiplexed cells to the side of the ATM switch, demultiplex the multiplexed cells that have entered from the side of the ATM switch and send the demultiplexed cells to the line terminating circuits 12a, 12a', respectively.

An interface unit 13 for interfacing the lines with the ATM switches is mounted on the shelf SIFSH. The interface unit 13 has an interface (SINF) 13a for interfacing a 156M line, an interface (DS-3) 13b for interfacing a 45M line, interfaces (ADSINF) $13c_1$, $13c_2$ connected to the interface units 12, 12', and common shelf portions $13d_1$, $13d_2$, which are provided between each interface and the ATM switches, for multiplexing and demultiplexing cells and performing control for replacing the VPI/VCI and adding on the tag information. A maximum of eight common shelf portions $12b_1$, $12b_2$, $12b_1$', $12b_2$' are connected to each of the interfaces (ADSINF) $13c_1$, $13c_2$. Cells that have entered the interfaces (ADSINF) $13c_1$, $13c_2$ from these common shelf portions are multiplexed and outputted to the common shelf portions $13d_1$, $13d_2$. Multiplexed cells that have entered the interfaces (ADSINF) $13c_1$, $13c_2$ from the common shelf portions $13d_1$, $13d_2$ are demultiplexed and sent to the common shelf portions $12b_1$, $12b_2$, $12b_1$', $12b_2$'. The interfaces (ADSINF) $13c_1$, $13c_2$ are redundant and so are the common shelf portions $13d_1$, $13d_2$.

An interface unit 14 for looping back cells, which have entered via the ATM switch for the IN direction, to the ATM switch for the OUT direction is mounted on the shelf SIFSH. The interface unit 14 has redundant common shelf portions $14a_1$, $14a_2$ and redundant loop-back portions (LLP0, LLP1) $14b_1$, $14b_2$. Numeral 15 denotes a network controller (BCPR), 16 a bus line and 17 an interface for interfacing the network controller and the ATM switches.

The flow of a user cell will now be described for a case in which the system 0 is the ACT system, the system 1 is the SBY system and a cell that has entered from a line A is routed to a line B.

Data that has entered from the line A is converted into a cell by the line terminating circuit 12a, after which the cell is branched in two directions to enter the interfaces (ADSINF) $13c_1$, $13c_2$ of systems 0 and 1 via the common shelf portions $12b_1$, $12b_2$ of systems 0 and 1, respectively. The interfaces (ADSINF) $13c_1$, $13c_2$ of systems 0 and 1 each branch the input cell in two directions so that the cell enters the common shelf portions $13d_1$, $13d_2$ of systems 0 and 1, respectively. The common shelf portions $13d_1$, $13d_2$ of systems 0 and 1 each discard (see the "x" marks) the cell that has entered from the interface (ADSINF) $13c_2$ of system 1 but output the cell that has entered from the interface (ADSINF) $13c_1$ of system 0 to the respective ATM switches $11_1$, $11_2$ of systems 0 and 1.

The ATM switches $11_1$, $11_2$ of systems 0 and 1 subject the input cell to switching so that the cell from each ATM switch enters the loop-back interface unit 14. Each of the common shelf portions $14a_1$, $14a_2$ of systems 0 and 1 branches the input cell in two directions so that the cell enters the loop-back portions $14b_1$, $14b_2$ of systems 0 and 1. The loop-back portions $14b_1$, $14b_2$ of systems 0 and 1 each discard the cell from the common shelf portion $14a_2$ of system 1 but cause the cell from the common shelf portion $14a_1$ of system 0 to loop back to the common shelf portions $14a_1$, $14a_2$ of systems 0 and 1. The common shelf portion $14a_1$, $14a_2$ input the cell, which has been looped back by the loop-back portion of system 0, to the ATM switches $11_1$, $11_2$ of systems 0 and 1, and the ATM switches $11_1$, $11_2$ subject the input cell to switching so that the cell enters the common shelf portions $13d_1$, $13d_2$.

The common shelf portions $13d_1$, $13d_2$ each branch the input cell in two directions so that the cell enters the interfaces (ADSINF) $13c_1$, $13c_2$ of systems 0 and 1. The interfaces (ADSINF) $13c_1$, $13c_2$ of systems 0 and 1 each discard the cell that has entered from system 1 but input the cell that has entered from system 0 to the line terminating circuit 12a' via the common shelf portions $12b_1'$, $12b_2'$ of the line interface unit 12'. The line terminating circuit 12a' restores the cell from the common shelf portion $12b_1'$ of system 0 to the original data and sends the data to the line B.

Thus, in a redundant ATM exchange, duplicates of the ATM switch and common shelf portions are provided. Moreover, the same cell is passed through the ACT and SBY systems and the two systems are placed in an identical state. If the active system (ACT system) fails and can no longer supply normal service, the standby system (SBY system) is made the active system immediately without discarding a cell, thus enabling service to continue. In addition, a changeover between the active system and the standby system can be performed periodically.

In an ATM exchange having a redundant structure, it is desired that continuity within the ATM switches be verifiable by the loop-back test in both the ACT and SBY systems. In other words, if continuity solely of the ACT system can be tested but not continuity of the SBY system, a latent failure may develop in the SBY system. This means that even if a changeover is made to the SBY system owing to occurrence of failure in the ACT system, a situation may arise in which normal service cannot be continued.

In the conventional ATM exchange having a redundant structure, the arrangement is such that an incoming cell from the ACT system is regarded as being an effective cell by the common shelf portion and is passed to the ATM switch, whereas an incoming cell from a device in the SBY system or from a device in an OUS (out-of-service) state is stopped by the common shelf portion. That is, in the conventional ATM exchange having a redundant structure, even if a test cell from a device in the OUS state or from a device in the SBY state is looped back, the cell is stopped at the common shelf portion. Thus, a problem encountered is that a device in the SBY system or in the OUS state cannot be tested.

FIG. 22 is a diagram showing part of the construction of an ATM exchange useful in describing a situation in which a device in the SBY system cannot be tested. Here the line terminating unit and interface unit are drawn in detail and portions identical with those of FIG. 20 are designated by like reference characters. Cell flow is indicated by the arrows attached to the solid line. Data that has entered from the line A is converted into a cell by the line terminating circuit 12a and the cell is then branched in two directions so as to enter the interfaces (ADSINF) $13c_1$, $13c_2$ of systems 0 and 1 via the common shelf portions $12b_1$, $12b_2$ of the 0 and 1 systems, respectively. The interfaces (ADSINF) $13c_1$, $13c_2$ of systems 0 and 1 each branch the input cell in two directions so that the cell will enter the common shelf portions $13d_1$, $13d_2$ of systems 0 and 1. The common shelf portions $13d_1$, $13d_2$ of systems 0 and 1 each discard (see the "x" marks) the cell that has entered from the interface (ADSINF) $13c_2$ of system 1 but output the cell that has entered from the interface (ADSINF) $13c_1$ of system 0 to the respective ATM switches of systems 0 and 1. As a result, even if a test cell TCL outputted by a testing device (not shown) is looped back by an SBY device (such as the interface $13c_2$), as indicated by the dashed line, the cell is stopped by the common shelf portions $13d_1$, $13d_2$ and the SBY device cannot be tested.

FIG. 23 is a diagram showing a part of the construction of an ATM exchange useful in describing a situation in which a device in the OUT state cannot be tested. Here the interface unit 13 is shown in detail and portions identical with those of FIG. 20 are designated by like reference characters. The flow of a test cell TCL is indicated by the arrows attached to the solid line. An example will be described in which the interface $13c_2$ of system 1 is in the OUS state and a loop is set in order to subject the interface $13c_2$ to the loop-back test. The test cell TCL outputted by a testing device (not shown) enters the interface $13c_2$ of system 1 from the ATM switch of system 1 via the common shelf portion $13d_2$ of system 1. The cell is looped back and branched in two directions at the interface $13c_2$ of system 1 so as to enter the common shelf portions $13d_1$, $13d_2$ of systems 0 and 1. Since the arrangement is such that the common shelf portions $13d_1$, $13d_2$ will not accept a cell from a device in the OUS state, passage of the test cell is blocked. As a result, the test cell cannot be returned to the testing device and the loop-back test cannot be carried out.

Thus, in an arrangement in which a test cell is handled in the same manner as an ordinary user cell, a test cell from a device in the SBY system or from a device in the OUS state is blocked by the common shelf portions and therefore cannot be returned to the testing device. This makes it impossible to perform the loop-back test.

SUMMARY OF THE INVENTION

An object of the present invention is to provide an ATM exchange and a method of testing the same in which the loop-back continuity test can be performed on an ATM switch not only in the ACT system but also in the SBY system.

Another object of the present invention is to provide an ATM exchange and a method of testing the same in which, when loop-back is performed by units downstream of an ATM switch, a test cell that has passed through a component under test is returned to a testing device without being stopped along the way, thereby making it possible to test the above-mentioned component.

A further object of the present invention is to provide an ATM exchange and a method of testing the same in which, even if one system (the ACT or SBY system) is shut down and a large number of cells are passed through this system to perform a concentrated test, the traffic in the other system is not adversely affected.

In accordance with the present invention, the foregoing objects are attained by transmitting a test cell from a testing device, causing the test cell to pass through ATM switches of an active system and a standby system by loop-back, returning the cell that has passed through the ATM switches of both systems to the testing device, and performing a test of the active and standby systems by comparing data contained in the transmitted cell with data contained in a test cell received from the active system or standby system.

Further, the foregoing objects are attained by performing a test by transmitting a test cell to both an active system and a standby system when conditions are normal, conducting a test by transmitting the test cell solely to whichever system has failed when a failure occurs, receiving the test cell that has returned upon passing through the failed system, and conducting a test of the failed system by comparing data contained in the transmitted test cell with data contained in the received test cell.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing the composition of a routing table;

FIG. 12 is a diagram for describing the testing of ATM switches for the IN direction;

DESCRIPTION OF THE PREFERRED EMBODIMENTS (a) General features of the invention FIG. 1 is a diagram for describing the general features of the present invention. Numeral 21 denotes ATM switches in two systems, namely an active system (ACT system) and a standby system (SBY system), in which numeral $21_1$ represents ATM switches of the ACT system and numeral $21_2$ ATM switches of the SBY system. The ATM switches $21_1$ and $21_2$ of the respective ACT and SBY systems have first ATM switches $21_{11}$ and $21_{21}$ for the IN direction and second ATM switches $21_{12}$ and $21_{22}$ for the OUT direction, respectively. Numeral 31 denotes a testing device for transmitting a test cell to both the active and standby systems and performing a continuity test of the ATM switches in the active and standby systems. First and second loop-back units 41, 51 return the test cells to the testing device 31 by loop-back via the ATM switches of the active and standby systems. Each of the first and second loop-back units 41, 51 has loop-back portions for both the ACT and SBY systems.

Figure 1:
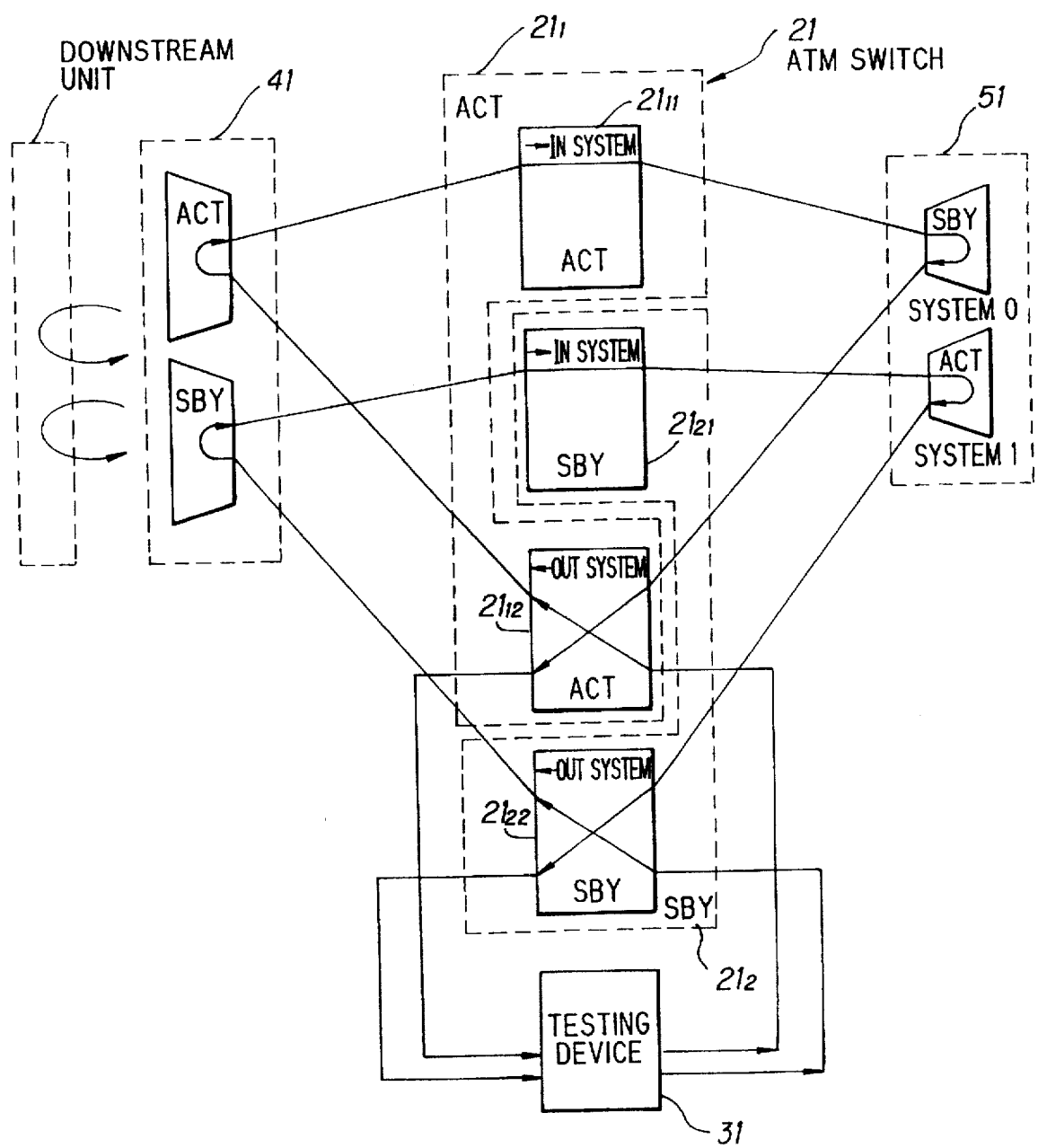
FIG. 1 is diagram for describing the principles of the present invention.

If the ATM switches $21_{11}$, $21_{21}$ for the IN direction are to be tested, test cells are transmitted to both the active and standby systems from the testing device 31. The ATM switches $21_{12}$, $21_{22}$ for the OUT direction each input the test cells to the first loop-back unit 41 by switching. The first loop-back unit 41 loops back the inputted test cells to pass them through the IN-direction ATM switches $21_{11}$, $21_{21}$, which are to be tested, and feed them into the second loop-back unit 51. The loop-back 51 loops back the entered test cells so that the cells enter the testing device 31 via the ATM switches $21_{12}$, $21_{22}$ for the OUT direction. The testing device 31 performs the continuity test of the ATM switches in the active and standby systems by comparing the data contained in the transmitted test cell with the data contained in the test cell received from the active system or standby system. It should be noted that testing of the ATM switches for the OUT direction can be performed in a similar manner.

By adopting this arrangement, both systems can be tested for continuity while the flow of the cells in the ACT and SBY systems is kept the same. In addition, since the flows of the test cell and user cell in both systems are identical, a changeover to the standby cell can be made immediately to continue service if a failure develops in the ACT system during the test. Furthermore, by changing the VPI/VCI contained in the test cell, the loop-back routes in the ATM switches can be changed over successively to perform the continuity test of the ATM switches.

In a case where the component to be tested is connected to the ATM switch downstream thereof, the test cells are transmitted in the downstream direction via the ATM switches $21_{12}$, $21_{22}$ of the ACT and SBY systems, the test cells are looped back at a prescribed points so as to pass through the tested units, the test cells that have passed through the tested units are received via the ATM switches $21_{11}$, $21_{21}$ of the active and standby systems and the tested units are subjected to the continuity test by comparing the data contained in the transmitted cells with the data contained in the test cells received from the active and standby systems. Control for loop-back and passage of the test cell in each unit is carried out as follows: Before the test cell is passed through the systems, whether or not the test cell is to be looped back and whether or not the test cell is allowed to pass is set for each unit. The test cell is looped back by a unit for which loop-back has been designated and is allowed to pass by a unit for which passage has been designated. As a result, the test cell is made to traverse the unit undergoing testing.

If this arrangement is adopted, a cell from an SBY device or from a device in the OUS state is not stopped but is allowed to pass and return to the testing device so that these devices can be tested.

When a failure develops in a certain system, there are situations in which it is necessary to feed test cells into this system in concentrated fashion in order to perform the test. However, in testing of an ATM exchange having a redundant structure, feeding test cells also into the active system in a concentrated manner can have a deleterious effect upon the traffic in the active system. Accordingly, the system in which a failure has developed is shut down, a test cell is sent solely to the shut-down system from the testing device, a test cell that returns upon passing through this system is received and a continuity test of the system that has been shut down is performed by comparing the data contained in the transmitted test cell with the data contained in the received test cell. If this arrangement is adopted, the failed system can be subjected to a concentrated continuity test without adversely affecting the traffic in the active system. In addition, if an arrangement is adopted in which two testing devices are provided, a continuity test of the shut-down system is performed by one testing device and a continuity test of the active system is performed by the other testing device, then the shut-down system can be tested without adversely affecting the traffic in the active system and a test of the active system can be performed at the same time.

(b) ATM exchange (b-1) Overall configuration

Figure 2:
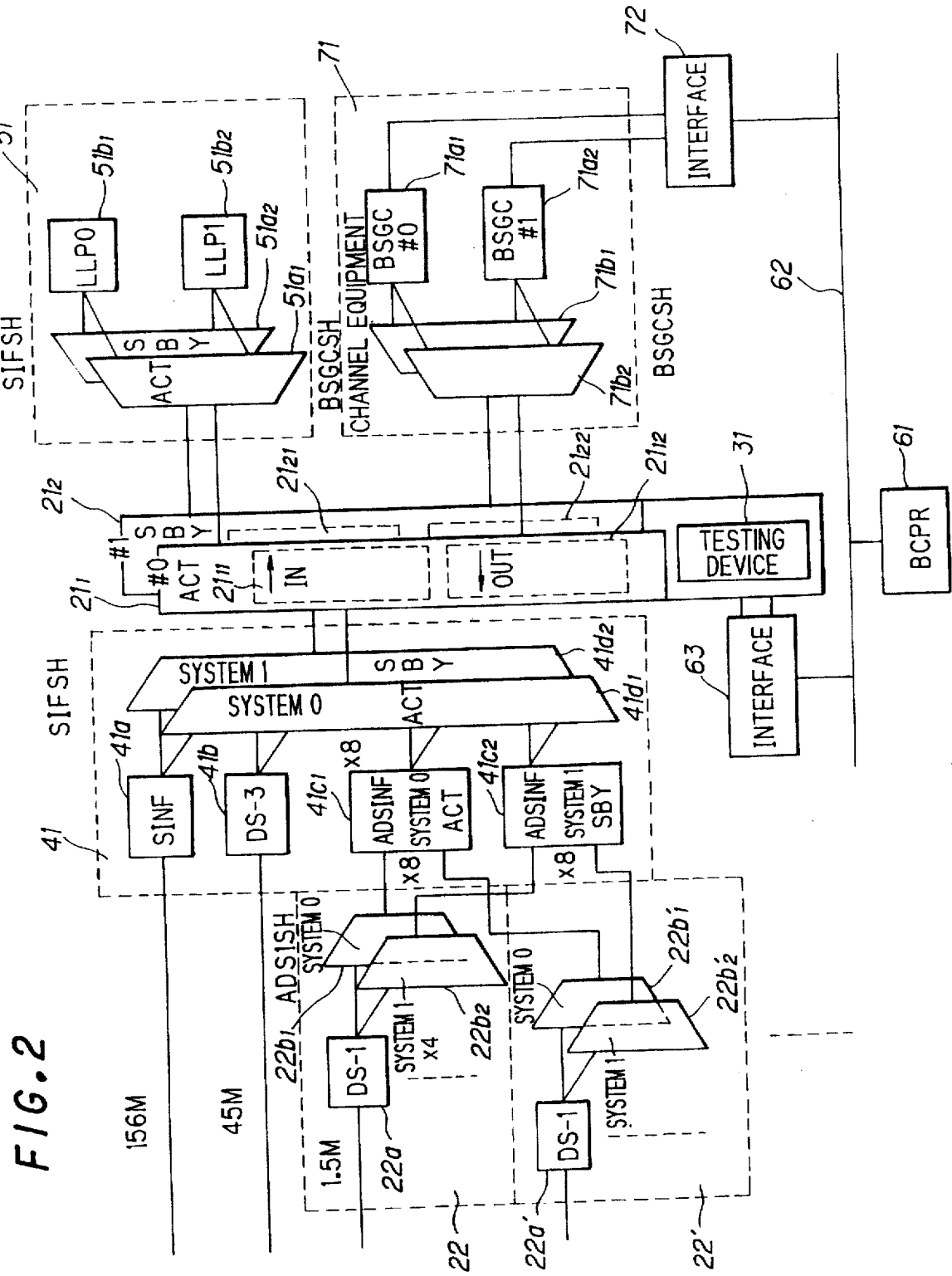
FIG. 2 is a block diagram illustrating an ATM exchange with a redundant structure having a testing function.

FIG. 2 is a block diagram illustrating the construction of an ATM exchange with a redundant structure having a testing function. Numerals $21_1$, $21_2$ denote the ATM switches, which are redundant. One of the ATM switches constitutes the active system (ACT system or system 0) #0 and the other constitutes the standby system (SBY system or system 1) #1. The ATM switches $21_1$, $21_2$ have first ATM switches $21_{11}$ and $21_{21}$ for the IN direction from the terminal side and second ATM switches $21_{12}$ and $21_{22}$ for the OUT direction to the terminal side, respectively. Numerals 22, 22' ... denote interface units each of which terminates a 1.5M subscriber. These are mounted on the shelf ADS1SH. The interface units 22 and 22' respectively include line terminating circuits (DS-1) 22a and 22a' for converting data from the 1.5M subscriber into ATM cells and restoring ATM cells from the ATM switch to subscriber data, and redundant common shelf portions $22b_1$, $22b_2$ and $22b_1'$, $22b_2'$ for multiplexing and demultiplexing cells. The line terminating circuits 22a, 22a' branch cells in two directions so that the cells will enter the common shelf portions $22b_1$, $22b_2$, $22b_1'$, $22b_2'$ of the ACT and SBY systems. Though only one each of the line terminating circuits 22a, 22a' is shown, four of these circuits, for example, are provided and connected to each one of the common shelf portions $22b_1$, $22b_2$, $22b_1'$, $22b_2'$ of the ACT and SBY systems. Subscribers accommodated by the line terminating circuits 22a, 22a' are a 1.5M frame relay (FR) and an SMDS subscriber line. The common shelf portions $22b_1$, $22b_2$ and $22b_1'$, $22b_2'$ multiplex the cells outputted by each of the line terminating circuits 22a and 22a', respectively, output the multiplexed cells to the side of the ATM switch, demultiplex the multiplexed cells that have entered from the side of the ATM switch and send the demultiplexed cells to the line terminating circuits 22a, 22a', respectively.

The testing device 31 performs a continuity test on the ATM switch. The testing device 31 transmits test cells to both the active and standby systems, receives test cells that have returned upon passing through the ATM switches of both systems and performs a continuity test of the ATM switches in the active and standby systems by comparing the data contained in the transmitted test cells with the data contained in the test cells received from the active and standby systems.

The interface unit 41 interfaces the lines with the ATM switches and is mounted on the shelf SIFSH. The interface unit 41 has an interface (SINF) 41a for interfacing a 156M line, an interface (DS-3) 41b for interfacing a 45M line, interfaces (ADSINF) $41c_1$, $41c_2$ connected to the interface units 22, 22', and common shelf portions $41d_1$, $41d_2$, which are provided between each interface and the ATM switches, for multiplexing and demultiplexing cells and performing control for converting the VPI/VCI and adding on the tag information. A maximum of Light common shelf portions $22b_1$, $22b_2$, $22b_1'$, $22b_2'$ ... are connected to each of the interfaces (ADSINF) $41c_1$, $41c_2$. Cells that have entered the interfaces (ADSINF) $41c_1$, $41c_2$ from these common shelf portions are multiplexed and outputted to the common shelf portions $41d_1$, $41d_2$. Multiplexed cells that have entered the interfaces (ADSINF) $41c_1$, $41c_2$ from the common shelf portions $41d_1$, $41d_2$ are demultiplexed and sent to the common shelf portions $22b_1$, $22b_2$, $22b_1'$, $22b_2'$ ..... The interfaces (ADSINF) $41c_1$, $41c_2$ are redundant and so are the common shelf portions $41d_1$, $41d_2$.

The interface unit 51 for looping back cells, which have entered via the ATM switches $21_{11}$, $21_{21}$ for the IN direction, to the ATM switches $21_{12}$, $21_{22}$ for the OUT direction is mounted on the shelf SIFSH. The interface unit 51 has redundant common shelf portions $51a_1$, $51a_2$ and redundant loop-back portions (LLP0, LLP1) $51b_1$, $51b_2$.

Numeral 61 denotes a network controller (BCPR), 62 a bus line and 63 an interface for interfacing the network controller and the ATM switches.

Numeral 71 denotes channel equipment (BSGC) mounted on the shelf BSGCSH. Under the control of the network controller 61, the channel equipment 71 terminates layer 2 in communication control with each subscriber terminal and each intra-office unit. The channel equipment 71, which includes redundant speech path controllers $71a_1$, $71a_2$ and redundant ATM interfaces $71b_1$, $71b_2$, has the following functions:

① a function for communicating with the network controller 61 via the interface 72;

② a function for terminating layer 2 of each communication control under the control of the network controller 61;

③ a function for initially setting and monitoring ports related to intra-office communication links; and ④ a function for interfacing the ATM switches by VCC (the VPI/VCI converter).

The speech path controllers $71a_1$, $71a_2$ terminate layer 2 in communication control with each subscriber terminal and each intra-office unit under the control of the network controller 61 in accordance with function ② (an LAPD function). Subscriber terminals are B-ISDN terminals, frame relay terminals (FR terminals), etc. Intra-office units are various interfaces (SINF, DS1, DS3, etc.), common shelf portions, etc. The speech path controllers $71a_1$, $71a_2$ terminate layer 2 in communication control between the network controller and all intra-office units in accordance with the function ③ of intra-office communication links. Furthermore, the ATM interfaces $71b_1$, $71b_2$ disassemble and assemble cells, change the VPI/VCI and control the adding on of the tag information in accordance with function ④.

(b-2) Construction of line terminating circuits (DS-1)

Figure 3:
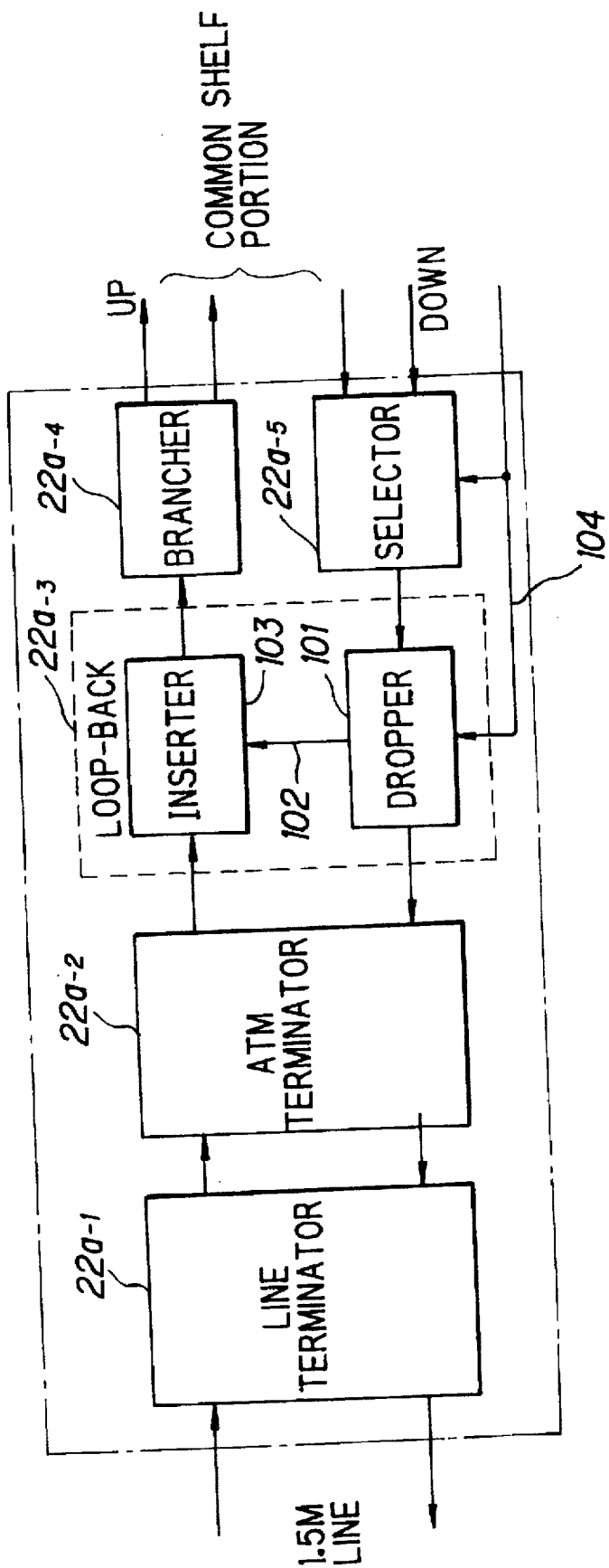
FIG. 3 is a block diagram illustrating a line terminating circuit (DS1)

FIG. 3 is a block diagram illustrating the line terminating circuit DS-1 (22a, 22a'). Numeral 22a-1 denotes a line terminating set, 22a-2 an ATM terminating set for disassembling and assembling cells, 22a-3 a loop-back portion for looping back cells from the testing device, 22a-4 a brancher for branching cells to the ACT system and SBY system, and 22a-5 a selector for selecting cells from the ACT system and inputting the selected sells to the loop-back portion 22a-3. When loop-back is designated, the loop-back portion 22a-3 extracts, in a dropper 101, a cell having the designated VPI/VCI on the highway coming down from the ATM switch. The loop-back portion 22a-3 inputs this cell to an inserter 103, which is provided in the up-going highway, via a loop-back path 102. Whether loop-back is to be performed or not, as well as the VPI/VCI of the cell to be looped back, is designated by the network controller 61 (see FIG. 2). More specifically, when the loop-back point and the VPI/VCI of the cell to be looped back are designated by the network controller 61, the channel equipment 71 (FIG. 2) transmits the loop-back designating data to the SIF common shelf portions $14d_1$, $14d_2$ (FIG. 2). Upon receiving the loop-back designating data, the common shelf portions $14d_1$, $14d_2$ transmit the loop-back designating data to the designated point (the line terminating circuit DS-1, for example) via a control data highway 104, thereby executing loop-back. The selector 22a-5 similarly selects and outputs a cell of the ACT system designated by the network controller 61 via the channel equipment 71.

(b-3) Construction of ADS1 common shelf portions

Figure 4:
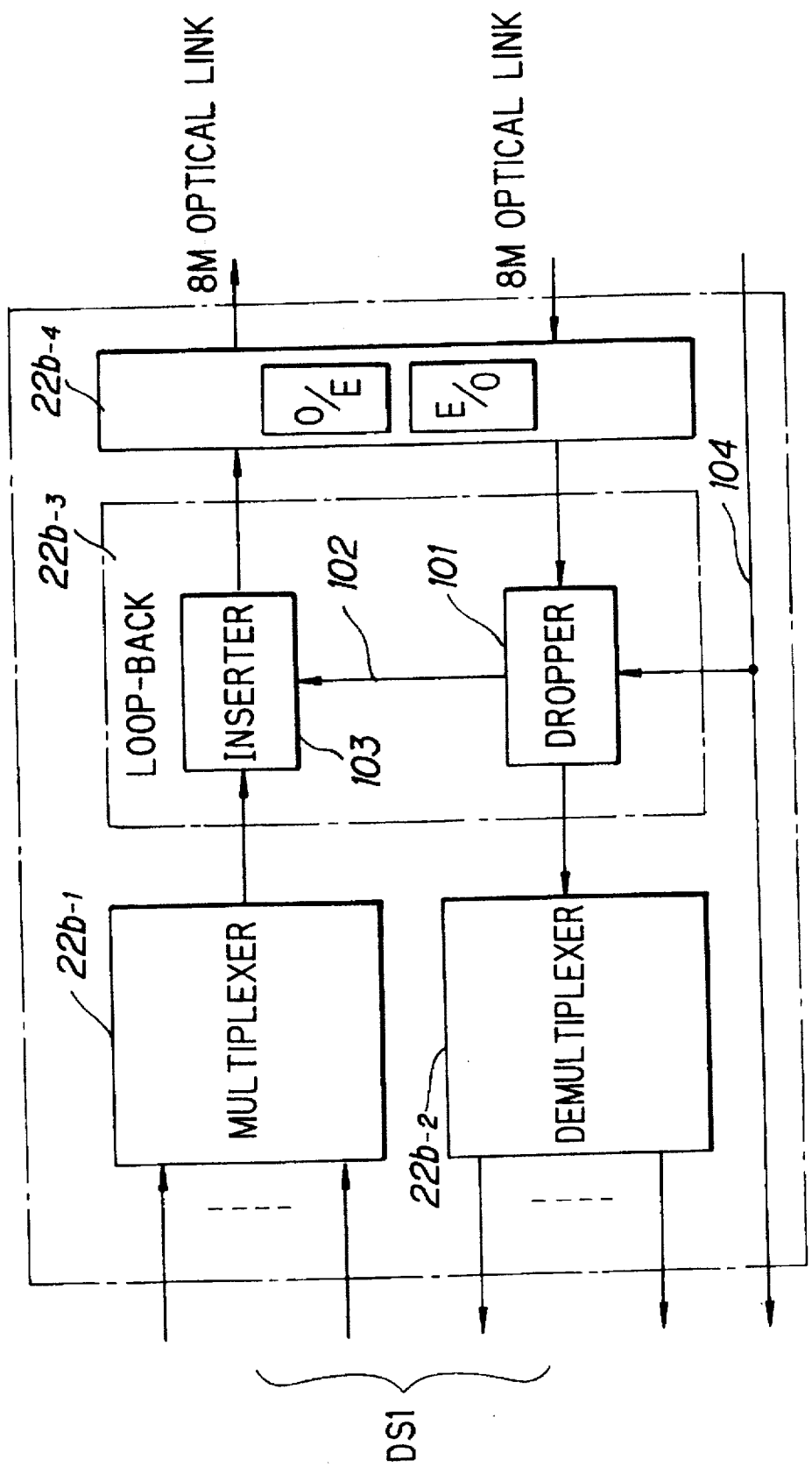
FIG. 4 is a block diagram illustrating a common shelf portion (ADS1SH)

FIG. 4 is a block diagram illustrating the construction of the ADS1 common shelf portion ($22b_1$, $22b_2$, $22b_1'$, $22b_2'$)

Numeral 22b-1 denotes a multiplexer for multiplexing cells outputted by each line terminating circuit DS-1, 22b-2 a demultiplexer for demultiplexing multiplexed cells, which have entered from the side of the ATM switches via the down highway, and transmitting the demultiplexed cells to each line terminating circuit DS-1, 22b-3 a loop-back portion for looping back cells from the testing device, and 22b-4 an optical interface having an E/O (electro-optical) transducer and an O/E (opto-electrical) transducer. The loop-back portion 22b-3 extracts, in a dropper 101, a cell having a specific VPI/VCI on the down highway from the ATM switches, and inputs this cell to an inserter 103, which is provided in the up highway, via a loop-back path 102. Whether loop-back is to performed or not, as well as the VPI/VCI of the cell to be looped back, is designated by the network controller 61 via the channel equipment 71 just as in the case of the line terminating circuits 22a, 22a'.

(b-4) Construction of interface (SINF)

Figure 5:
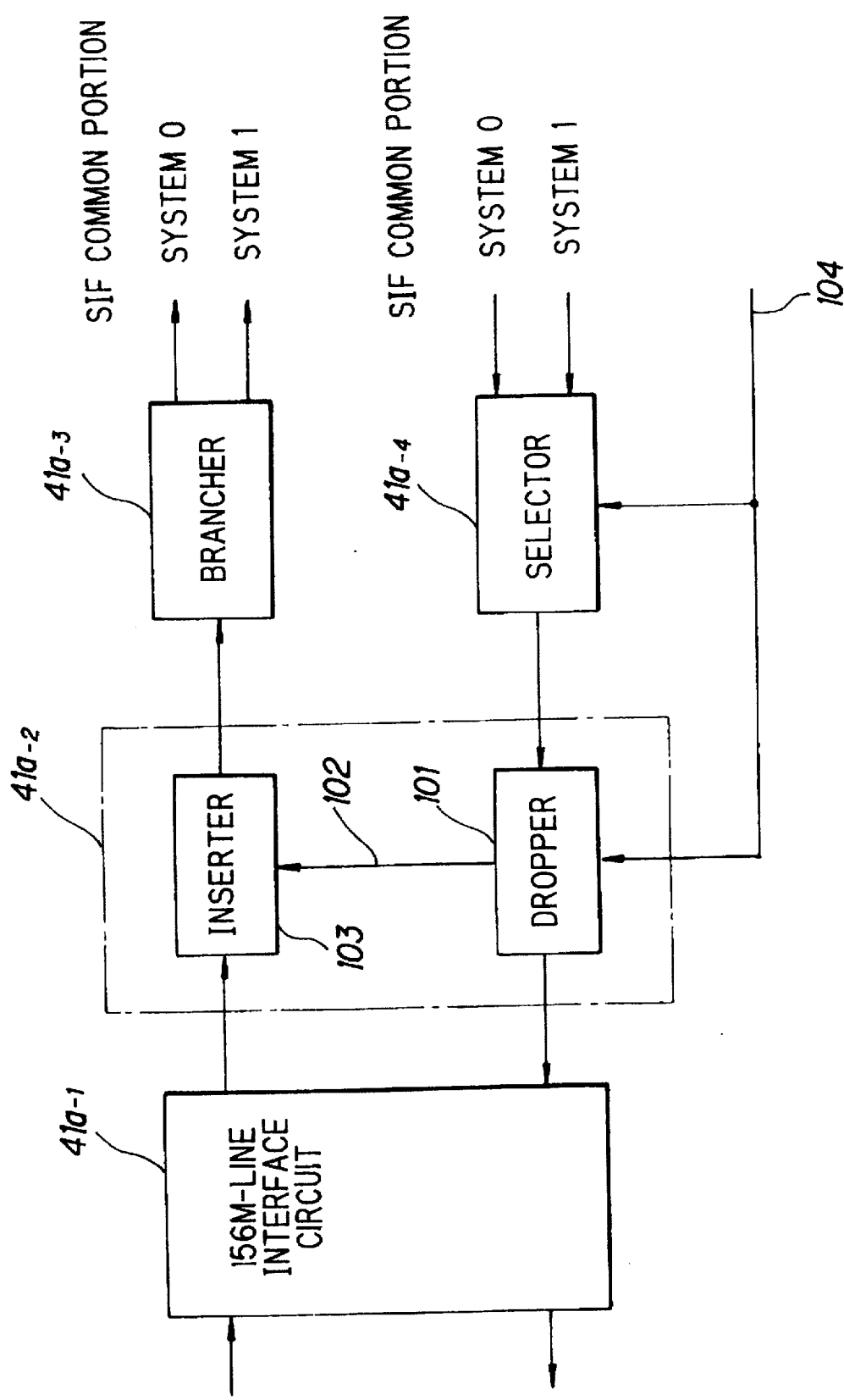
FIG. 5 is a block diagram illustrating an interface (SINF)

FIG. 5 is a block diagram showing the construction of the interface (SINF) 41a. The interface 41a includes a 156M line interface circuit 41a-1, a loop-back portion 41a-2 for looping back cells, a brancher 41a-3 for branching and outputting cells from the line, and a selector 41a-4 for selecting ACT-system cells from the cells of the ACT and SBY systems that have entered from the side of the ATM switches. The loop-back portion 41a-2 extracts, in a dropper 101, a cell having a specific VPI/VCI on the down highway from the ATM switches, and inputs this cell to an inserter 103, which is provided in the up highway, via a loop-back path 102. Whether loop-back is to performed or not, as well as the VPI/VCI of the cell to be looped back, is designated by the network controller 61 via the channel equipment 71 just as in the case of the line terminating circuits. The selector 41a-4 similarly selects and outputs a cell of the ACT system designated by the network controller 61 via the channel equipment 71.

(b-5) Construction of interface (ADSINF)

Figure 6:
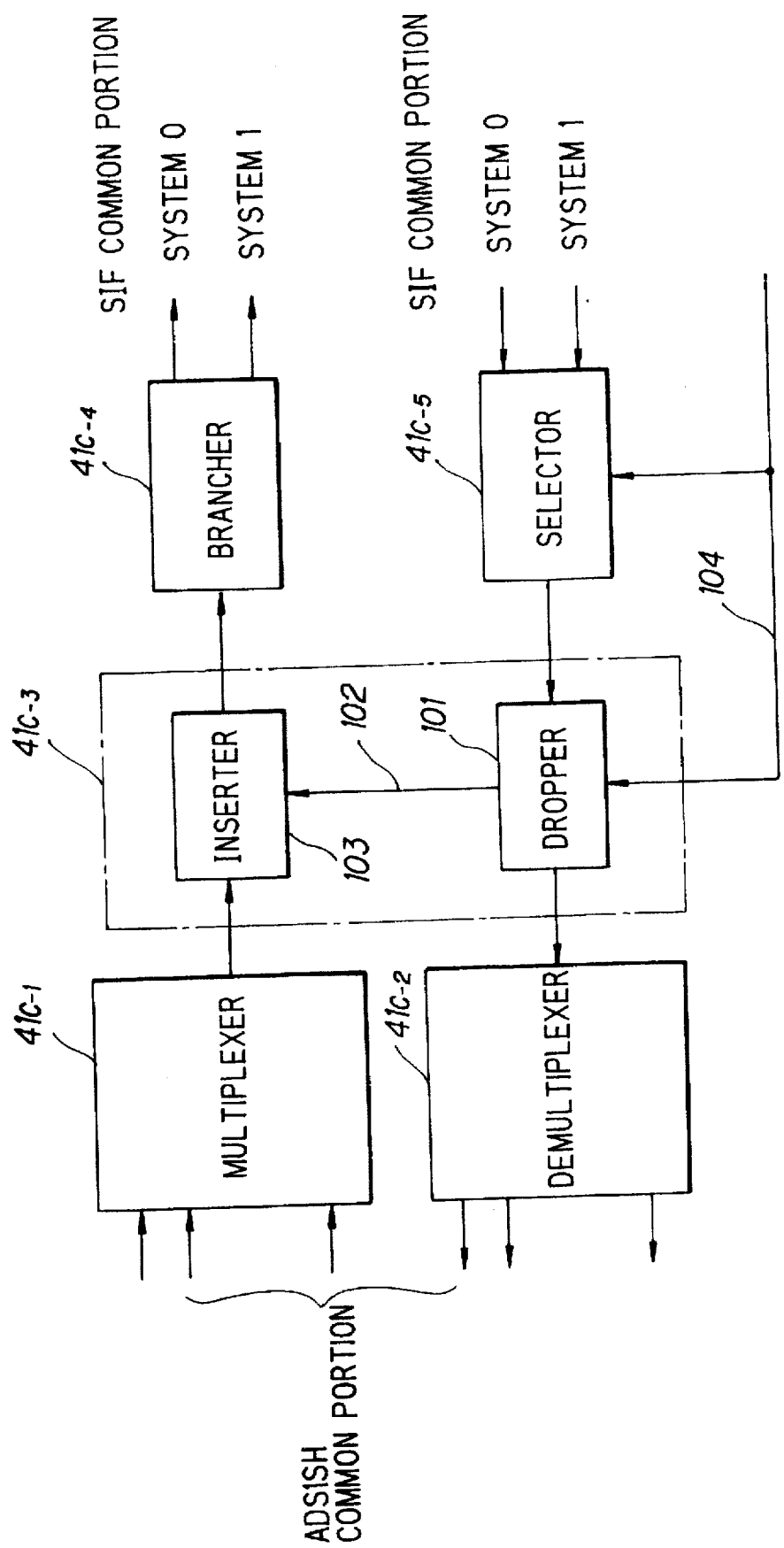
FIG. 6 is a block diagram illustrating an interface (ADSINF)

FIG. 6 is a block diagram illustrating the construction of the interface ADSINF ($41c_1$, $41c_2$). The interface ADSINF includes a multiplexer 41c-1 for multiplexing and then outputting cells that have entered from the common shelf portions ADS1SH, a demultiplexer 41c-2 for demultiplexing multiplexed cells that have entered from the side of the ATM switches, a loop-back portion 41c-3 for looping back cells, a brancher 41c-4 for branching cells, and a selector 41c-5 for selecting ACT-system cells from the cells of the ACT and SBY systems that have entered from the side of the ATM switches. The loop-back portion 41c-3 extracts, in a dropper 101, a cell having a specific VPI/VCI on the down highway from the ATM switches, and inputs this cell to an inserter 103, which is provided in the up highway, via a loop-back path 102. Whether loop-back is to be performed or not, as well as the VPI/VCI of the cell to be looped back, is designated by the network controller 61 via the channel equipment 71. The selector 41c-5 similarly selects and outputs a cell of the ACT system designated by the network controller 61 via the channel equipment 71.

(b-6) Construction of SIF common shelf portions

Figure 7:
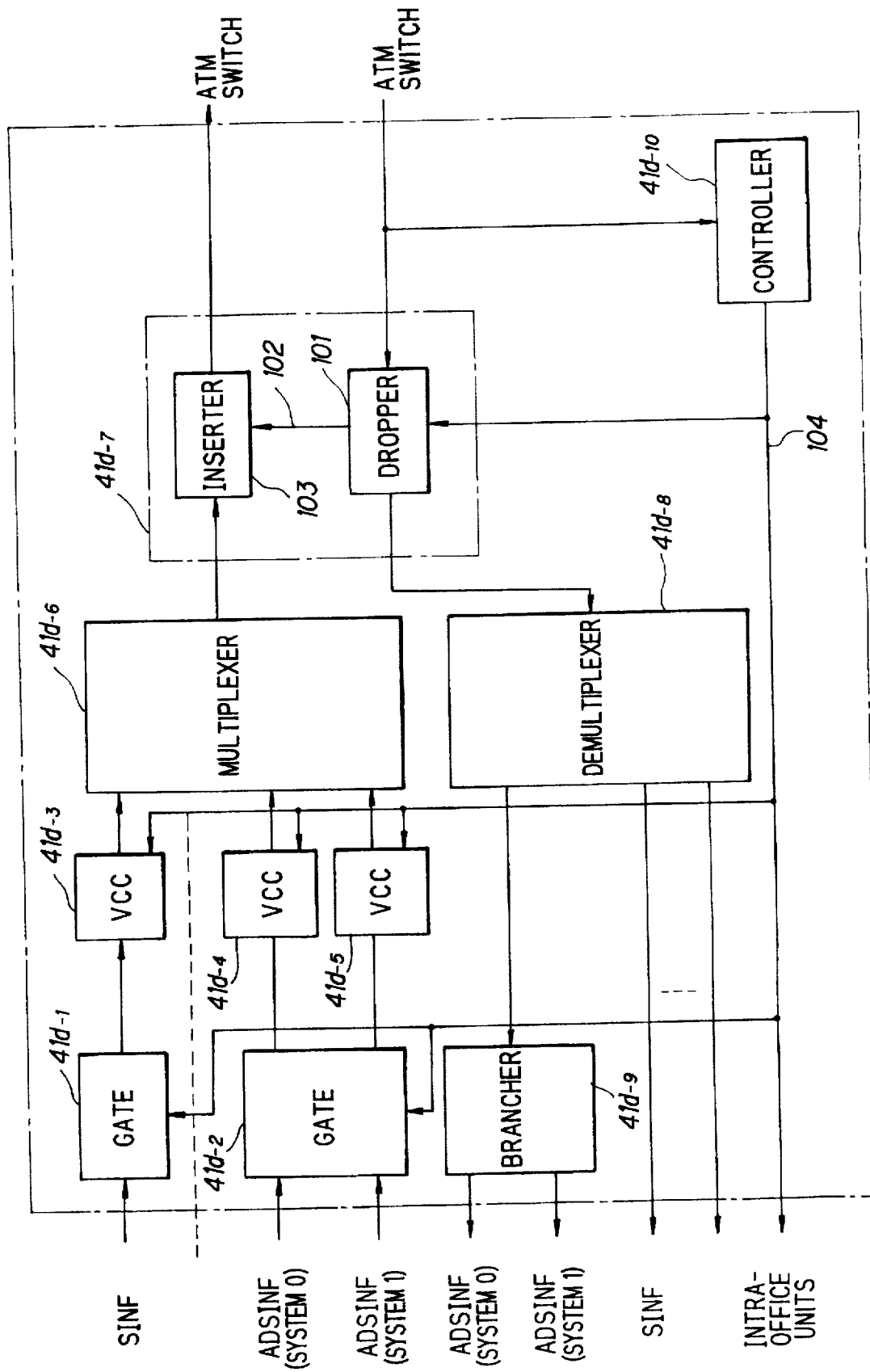
FIG. 7 is a block diagram illustrating a common shelf portion (SIF common shelf portion)

FIG. 7 is a block diagram illustrating the construction of the SIF common shelf portions $41d_1$, $41d_2$. Numerals 41d-1, 41d-2 denote gate circuits, and numerals 41d-3, 41d-4, 41d-5 denote VPI/VCI converters (VCC), each of which has a routing table, for changing the VPI/VCI of input cells and performing control for adding on tag information. Numeral 41d-6 designates a multiplexer for multiplexing cells outputted by each VCC, 41d-7 a loop-back portion for looping back cells, 41d-8 a demultiplexer for demultiplexing multiplexed cells that have entered from the ATM switches, 41d-9 a brancher for branching cells to the ACT and SBY systems, and 41d-10 a controller for receiving control data (instructions for loop-back, pass-thru and select) from the channel equipment 71, and notifying each intra-office unit of the control data via the control data highway 104.

In the case of a user cell, the gate 14d-1 passes the input cell if the interface (SINF) 41a is not in the OUS state but blocks the input cell if the interface 41a is in the OUS state. In the case of a test cell, however, the gate 14d-1 passes the cell even if the interface (SINF) 41a is in the OUS state. Further, in the case of the user cell, the gate 41d-2 ① selects and outputs the user cell, which has entered from the interface (ADSINF) of the ACT system, if this interface is in not the OUS state, and ② blocks the input cell if the interface of the ACT system is in the OUS state.

Further, the gate 41d-2 passes the test cell even if it is from a device in the SBY system or in the OUS state. That is, the gate 41d-2 passes a test cell that enters from both the ACT system and SBY system. By adopting the arrangement described above, a test cell from both a device in the SBY system and a device in the OUS state is passed so that it can return to the testing device.

As will be described later, a cell is made to contain prescribed identifying data so that it is possible to identify whether the cell is a user cell or a test cell.

The VPI/VCI converters (VCC) 41d-3–41d-5 refer to the routing table (see FIG. 8), which is set from the network controller 61 via the channel equipment 71, to replace the VPI/VCI of the input cell and add on tag information.

When test cells are looped back by the line terminating circuit DS-1, the test cells pass through the interfaces (ADSINF) of both the ACT and SBY systems and enter the gate 41d-2 of the SIF common shelf portion. The two test cells that have entered from the two systems pass through the gate. If no measures are taken in such case, the test cells will return to the testing device in duplicate and it will not be possible to conduct the test. For this reason, it is necessary to disable the test cell from the interface (ADSINF) of one of the systems, say the SBY system. Accordingly, an enable/disable item is prepared in the routing table (FIG. 8), the test cell of the SBY system is disabled and the test cell of the ACT system is enabled. The VCCs 41d-4, 41d-5 convert the VPI/VCI of the enabled test cell, add tag information to this cell and then input the cell to the multiplexer 41d-6. The disabled test cell is not outputted to the multiplexer 41d-6. As a result, of the test cells from the device in the OUS state, only the test cell that has passed through the ACT system is capable of being returned to the testing device.

The loop-back portion 41d-7 extracts, in a dropper 101, a cell having a specific VPI/VCI on the down highway from the ATM switches, and inputs this cell to an inserter 103, which is provided in the up highway, via a loop-back path 102. Whether loop-back is to be performed or not, as well as the VPI/VCI of the cell to be looped back, is designated by the network controller 61 via the channel equipment 71→ATM switch→controller 41d-10.

(b-7) Cell composition

Figure 9:
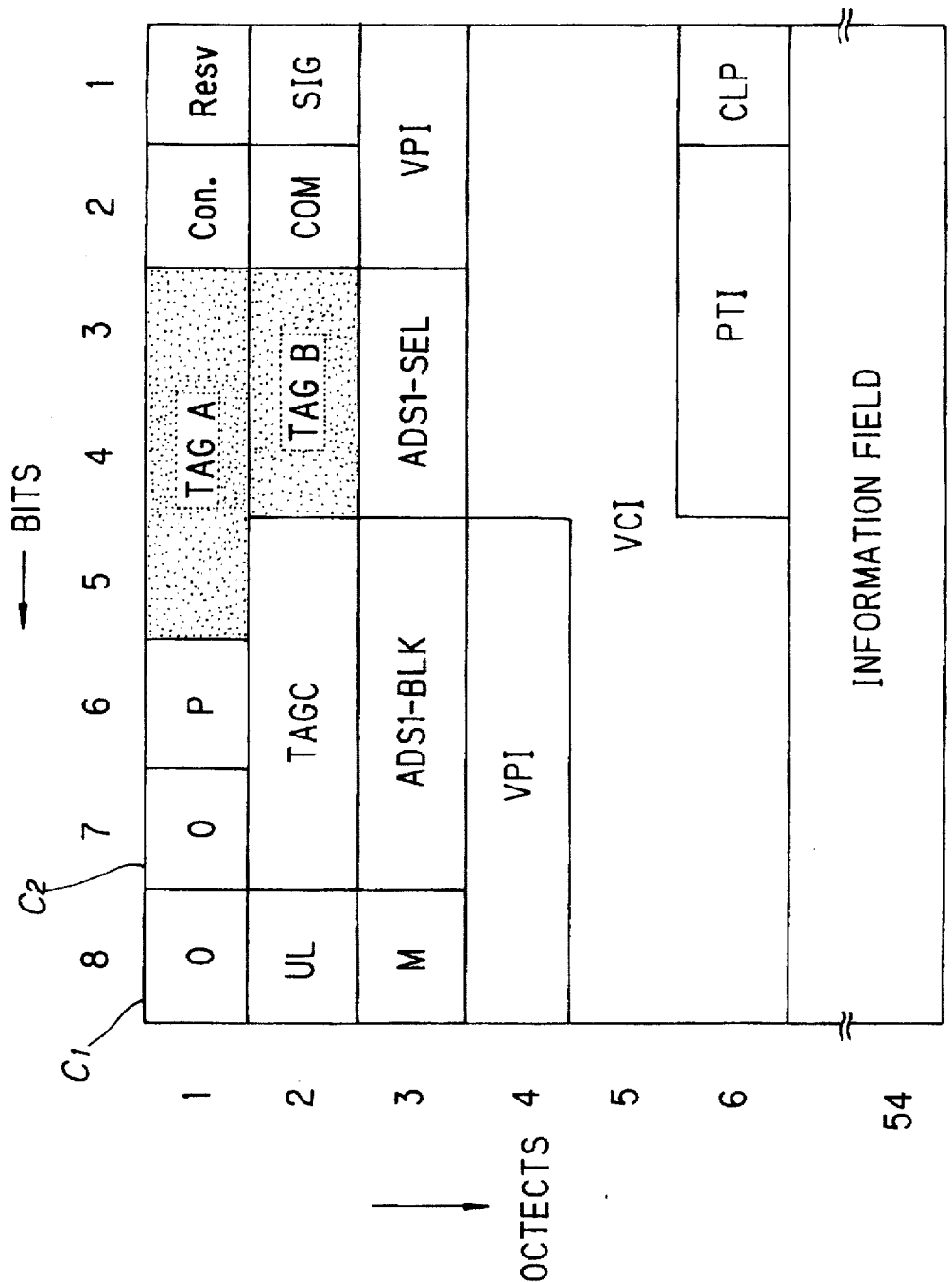
FIG. 9 is a diagram for describing the composition of a cell.

FIG. 9 is a diagram showing the composition of a cell. C1 represents a bit fixed at "0" and means 1:1 transmission. C2 is a bit that identifies whether a cell is a test cell or a user cell; "0" signifies a user cell and "1" a test cell. P is a bit indicating the level of priority; P="0" signifies high priority and P="1" signifies low priority. "Con." represents data for congestion control. This data is used to identify an important call, such as a call to the police or fire department. In a state of congestion, an important call is not abandoned but is always transmitted. "Resv" is a reserve bit, TAGA, TAGB, TAGC are tag information bits for path selection. PTI is a bit indicating the type of payload. CLP (cell loss priority) is a bit indicating whether it is permissible to abandon a call when a state of congestion prevails, and VPI, VCI are bits that hold the values of these indicators.

(c) Testing device (c-1) Construction of testing device

Figure 10:
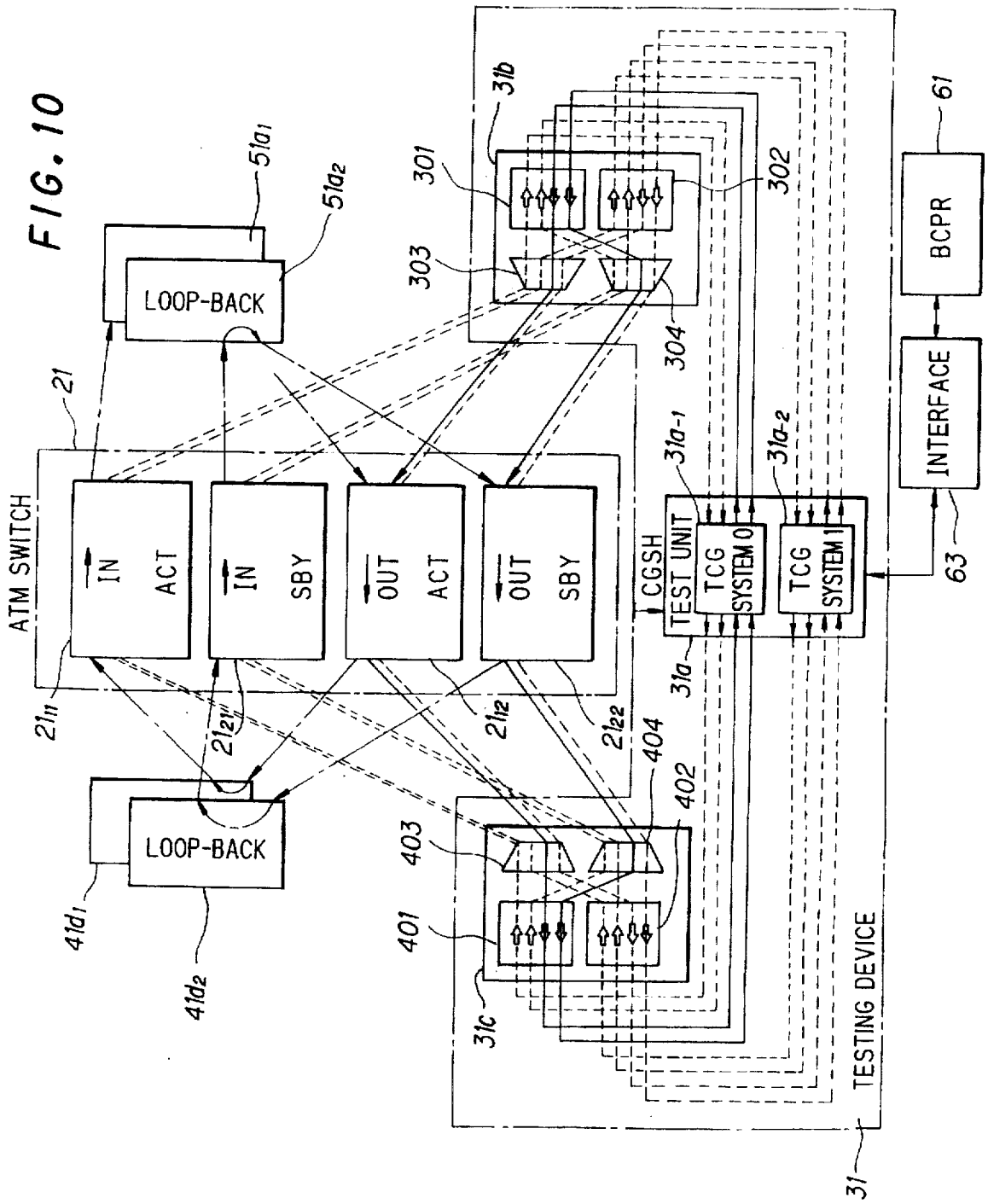
FIG. 10 is a diagram showing the construction of a testing device as well as the components peripheral thereto.

FIG. 10 is a diagram showing the construction of a testing device as well as the components peripheral thereto. Numeral 21 denotes the ATM switches in two systems, namely the ACT system and the SBY system, in which numeral $21_{11}$ denotes the first ATM switch for the IN direction of the ACT system, $21_{21}$ the first ATM switch for the IN direction of the SBY system, $21_{12}$ the second ATM switch for the OUT direction of the ACT system and $21_{22}$ the second ATM switch for the OUT direction of the SBY system. Numeral 31 denotes the testing device for transmitting a test cell to both the active and standby systems and performing a continuity test of the ATM switches in the active and standby systems. Numeral 61 denotes the network controller and 63 the interface.

The testing device 31 has a test unit 31a mounted on the shelf TCGSH, as well as first and second interfaces 31b, 31c mounted on the shelf SIFSH. The test unit 31a and the first and second interfaces 31b, 31c each have redundant structures.

The test unit 31a has first and second testing units 31a-1, 31a-2, each of which ① generates a test cell, ② sends the test cell to both the ACT and SBY systems and ③ receives the test cell of both systems returned upon passing through the components undergoing the test, and performs a normality/abnormality check of the ACT and SBY systems by comparing the data contained in the transmitted test cell and the data contained in the received test cell.

(c-2) Testing units

Figure 11:
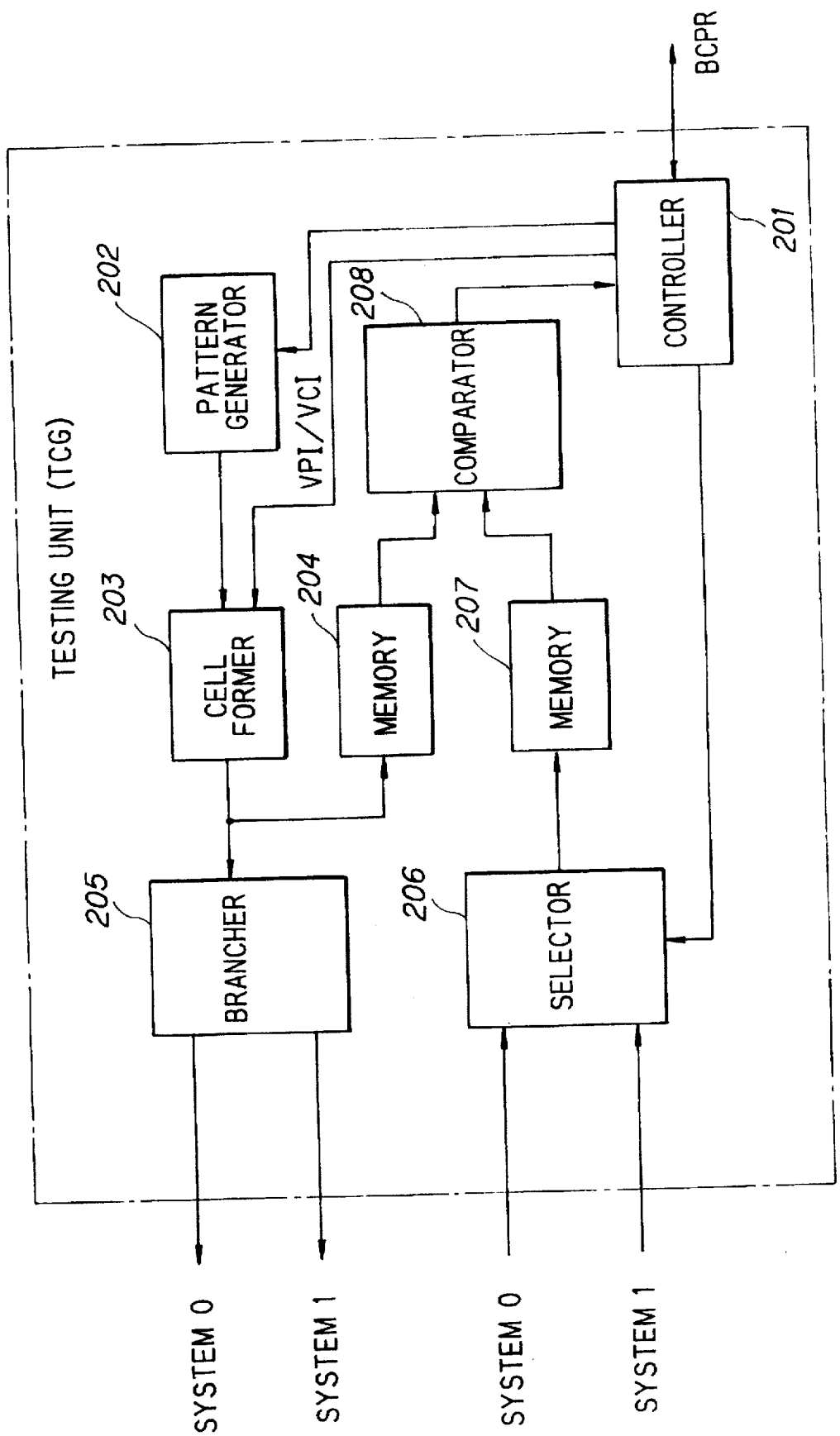
FIG. 11 is a block diagram showing the construction of a testing unit (TCG)

FIG. 11 is a block diagram showing the construction of each of the testing units 31a-1, 31a-2. Numeral 201 denotes a controller, which is connected to the network controller BCPR, for conducting a continuity test in accordance with a designation from the network controller. In the continuity test, set parameters and a command concerning the test are entered from a maintenance console (not shown). When this is done, the network controller 61 sends the entered parameters and test-related command to the controller 201, which starts control for the continuity test. Examples of the set parameters are values of the VPI/VCI specifying the test route, the contents of the test cell, an indication of whether the tested system is the ACT system or the SBY system, the number of test cells generated, the rate of generation, etc. Numeral 202 denotes a pattern generator for randomly generating test data superimposed upon a cell, 203 a cell forming unit, 204 a memory for storing transmission data contained in a sent cell, 205 a brancher for branching a cell in two directions, 206 a selector for selecting a test cell from a designated system (the tested system), 207 a memory for storing test data contained in the test cell selected by the selector, and 208 a comparator for comparing data contained in the sent test cell and the data contained in the received cell.

When start of the continuity test is designated, the controller 201 commands the pattern generator 202 to generate test data superimposed upon a cell. As a result, the pattern generator 202 randomly generates test data. The cell forming unit 203 produces a test cell using the data such as the VPI/VCI that has entered from the controller 201 as well as data that has entered from the pattern generator 202. This data is outputted to the memory 204 and brancher 205. The memory 204 stores the test cell for the purpose of subsequent comparison, and the brancher 205 branches the test cell so as to send it to the ACT system and the SBY system. Of the test cells that have entered via the ACT and SBY systems upon passing through the tested component, the selector 206 selects the test cell that has entered via the tested system (ACT or SBY), the memory 207 stores this test cell and the comparator 208 compares the data in the transmitted test cell with the data in the received test cell and inputs the result of the comparison to the controller 201. Depending upon whether the result of comparison indicates agreement or non-agreement, the controller 201 judges whether the tested component is normal or abnormal and notifies the network controller BCPR of the results of the test.

With reference again to FIG. 10, the first interface 31b, which has a redundant structure, includes adapters (TCGADP) 301, 302 for supervising interfacing with the test unit 31a, and ATM interfaces 303, 304 for supervising interfacing with the ATM switches. Terminals on the test-unit side of the adapter 301 are connected to the first testing unit 31a-1, and terminals on the switch side are connected to the ATM interfaces 303, 304. Terminals on the test-unit side of the adapter 302 are connected to the second testing unit 31a-2, and terminals on the switch side are connected to the ATM interfaces 303, 304.

The second interface 31c also has a redundant structure and includes adapters (TCGADP) 401, 402 for supervising interfacing with the test unit 31a, and ATM interfaces 403, 404 for supervising interfacing with the ATM switches. Terminals on the test-unit side of the adapter 401 are connected to the first testing unit 31a-1, and terminals on the switch side are connected to the ATM interfaces 403, 404. Terminals on the test-unit side of the adapter 402 are connected to the second testing unit 31a-2, and terminals on the switch side are connected to the ATM interfaces 403, 404.

Testing of ATM switches for IN direction

In a case where the ATM switches $21_{11}$, $21_{21}$ for the IN direction are tested by the first testing unit 31a-1, the first testing unit 31a-1 transmits two test cells for the ACT and SBY systems toward the adapter 301. As a result, the adapter 301 inputs the test cells of the ACT and SBY systems to the ATM interfaces 303 and 304 (see the solid lines). The ATM interfaces 303 and 304 add tag information to the respective input test cells and apply these cells to the ATM switches $21_{12}$, $21_{22}$ for the OUT direction, respectively. The ATM switches $21_{12}$, $21_{22}$ for the OUT direction transfer their test cells to the SIF common shelf portions (which are loop-back portions) 41d-1, 41d-2, respectively (see the one-dot chain lines). Each test cell is looped back by the loop-back portion, has its VPI/VCI converted and has tag information added to it. The resulting test cells then enter the ATM switches $21_{11}$, $21_{21}$ for the IN direction. The ATM switches $21_{11}$, $21_{21}$ route the test cells based upon the tag information and transfer them to the SIF common shelf portions $51a_1$, $51a_2$, which are loop-back portions. Thereafter, the test cells are looped back (see the one-dot chain lines) by these loop-back portions, enter the ATM interfaces 403, 404 of the second interface 31c via the ATM switches $21_{12}$, $21_{22}$, respectively, for the OUT direction and return to the first testing unit 31a-1 via the adapter 401 (see the solid lines).

Testing of ATM switches for OUT direction

In a case where the ATM switches $21_{12}$, $21_{22}$ for the OUT direction are tested by the first testing unit 31a-1, the first testing unit 31a-1 transmits two test cells for the ACT and SBY systems toward the adapter 401. As a result, the adapter 401 inputs the test cells of the ACT and SBY systems to the ATM interfaces 403 and 404. The ATM interfaces 403 and 404 add tag information to the respective input test cells and apply these cells to the ATM switches $21_{11}$, $21_{21}$ for the IN direction, respectively. The ATM switches $21_{11}$, $21_{21}$ for the IN direction transfer their test cells to the SIF common shelf portions (which are loop-back portions) 51a-1, 51a-2, respectively. Each test cell is looped back by the loop-back portion, has its VPI/VCI converted and has tag information added to it. The resulting test cells then enter the ATM switches $21_{12}$, $21_{22}$ for the OUT direction. The ATM switches $21_{12}$, $21_{22}$ route the test cells based upon the tag information and transfer them to the SIF common shelf portions $41d_1$, $41d_2$, which are loop-back portions. Thereafter, the test cells are looped back by these loop-back portions, enter the ATM interfaces 303, 304 of the first interface 31b via the ATM switches $21_{11}$, $21_{21}$, respectively, for the IN direction and return to the first testing unit 31a-1 via the adapter 301.

When testing is performed by the second testing unit 31a-2, this is carried out just as in the case of the first testing unit 31a-1.

(d) Test

A method of testing various components will now be described.

(d-1) ① Testing of ATM switches for IN direction

Figure 12:
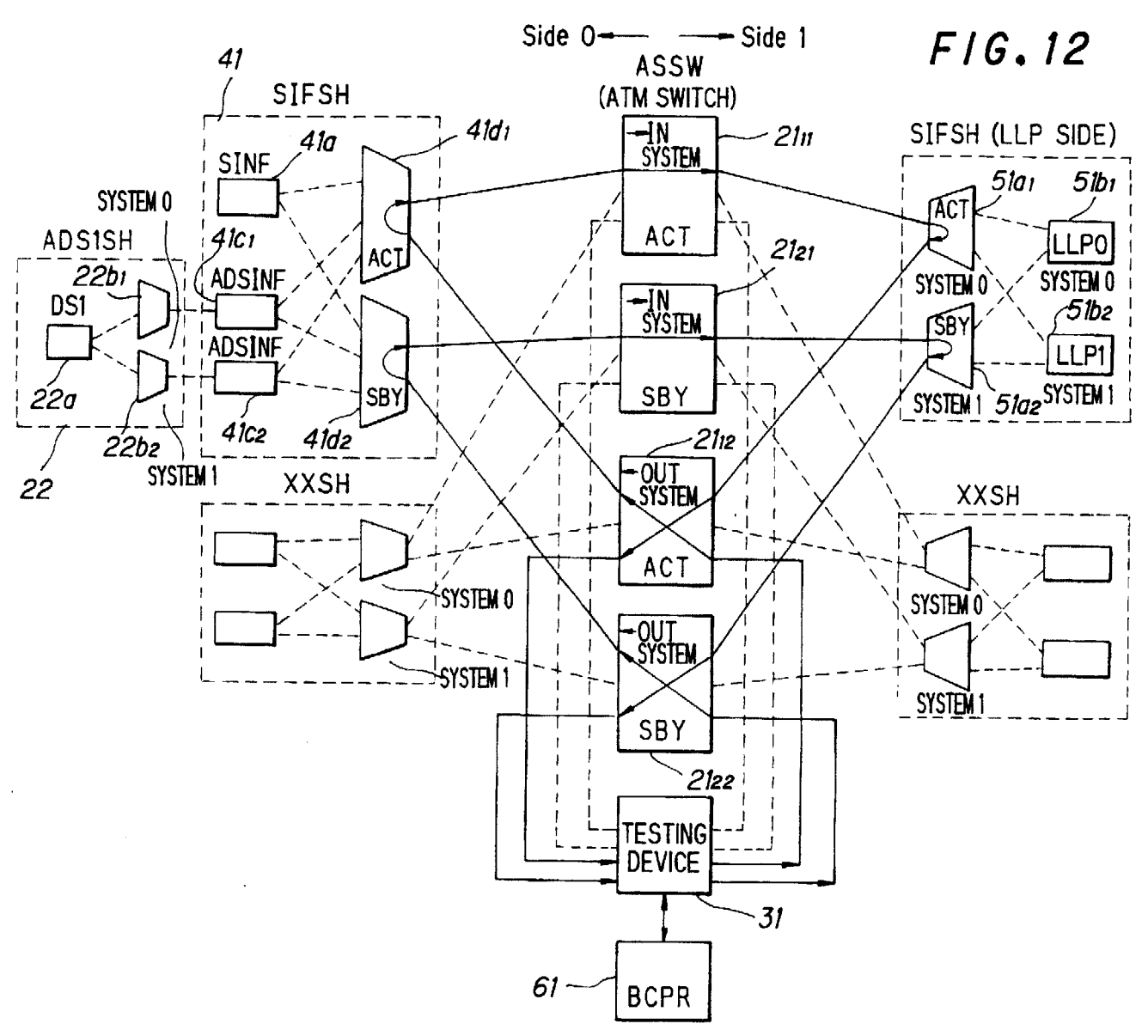

FIG. 12 is a diagram for describing the testing of ATM switches for the IN direction. Portions identical with those shown in FIG. 2 are designated by like reference characters.

When test parameters and a test command are entered from the maintenance console, the network controller 61 sets loop-back to the common shelf portions $41d_1$, $41d_2$ and common shelf portions $51a_1$, $51a_2$ via the channel equipment 71 (FIG. 2), sets the routing tables of the common shelf portions $41d_1$, $41d_2$ in such a manner that a test cell will pass through a test route within the switches, and sets the routing tables of the common shelf portions $51a_1$, $51a_2$ in such a manner that the test cell will return to the test unit 31.

Next, the network controller 61 commands the testing device 31 to start the test. In response to the command, the testing device 31 sends test cells to the ACT- and SBY-system ATM switches $21_{12}$, $21_{22}$ for the OUT direction. On the basis of tag information, the ATM switches $21_{12}$, $21_{22}$ for the OUT direction route the test cells and transfer them to the respective SIF common shelf portions 41d-1, 41d-2, which are loop-back units. The SIF common shelf portions 41d-1, 41d-2 loop back their test cells, refer to their routing tables to replace the VPI/VCI and add on the tag information and then enter the resulting test cells to the ATM switches $21_{11}$, $21_{21}$ for the IN direction, respectively. As a result, the test cells pass through the test routes of the ACT- and SBY-system ATM switches $21_{11}$, $21_{21}$ for the IN direction and enter the common shelf portions $51a_1$, $51a_2$ of the ACT and SBY systems.

The common shelf portions $51a_1$, $51a_2$ loop back the respective test cells, refer to their routing tables to add on the tag information and enter the resulting test cells to the ATM switches $21_{12}$, $21_{22}$ for the OUT direction. The cells return to the testing device 31 via the ATM switches (see the solid lines in FIG. 12).

The testing device 31 compares the data contained in the test cell received from whichever system has been designated, e.g., the ACT system, with the data contained in the test cell that was transmitted to this system, decides whether the tested route is normal or abnormal based upon whether comparison indicates agreement or non-agreement and notifies the network controller 61 of the decision. Thereafter, by successively changing the VPI/VCI, the testing device 31 changes the test route through the ATM switches for the IN direction to subject all routes to the continuity test. If it is so arranged that both cells received from the ACT and SBY systems are stored, one cell is selected for the comparison and then the other cell is selected for the comparison, then the normality/abnormality check can be performed for both systems simultaneously. In addition, the test of the ATM switches for the OUT direction can be performed in the same manner.

Thus, by virtue of the foregoing operation, the ATM switches of the ACT and SBY systems can be tested while the flow of test cells through the ACT and SBY systems is kept the same (the flow of the user cells also is kept the same as a matter of course). Further, since the flow of test cells and user cells is the same in the ACT and SBY systems, the SBY system can be made active immediately if a failure develops in the ACT system during testing. This allows continuation of service and testing. In this case, cells are not discarded.

(d-2) Testing of redundant equipment

Figure 13:
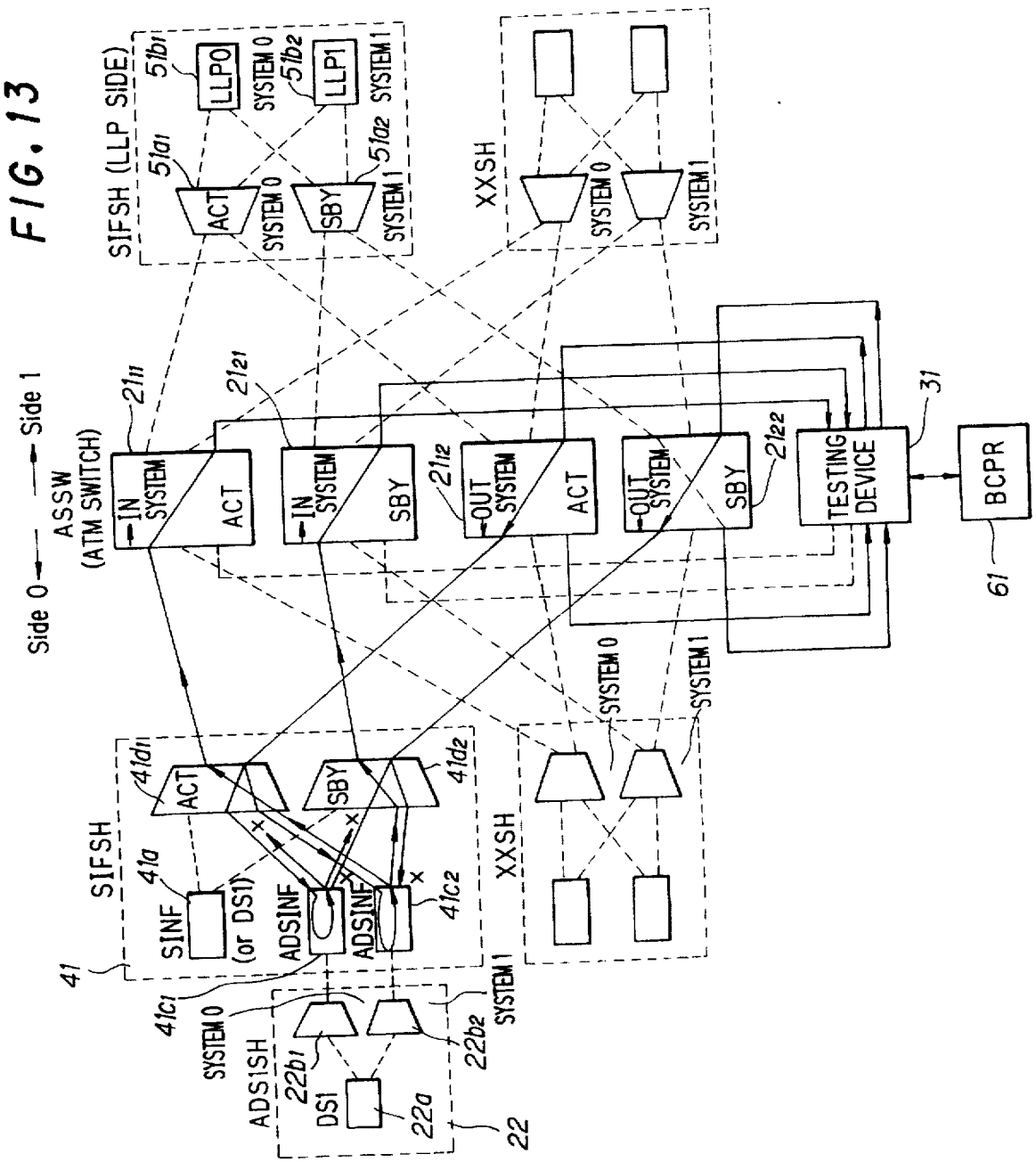
FIG. 13 is a diagram for describing the testing of an interface (ADSINF), which is provided in duplicate for reduncancy.

FIG. 13 is a diagram for describing the testing of redundant equipment, e.g., the interface (ADSINF) $41c_2$ of the SBY system. It will be assumed here that the ATM switches 21 and common shelf portions $41d_1$, $41d_2$ are normal.

When test parameters, a test command and data to be tested are entered from the maintenance console, the network controller 61 places the interface (ADSINF) $41c_2$ in the OUS state and sets the interfaces $41c_1$, $41c_2$ for loop-back. Further, with regard to test cells, the network controller 61 sets the common shelf portions $41d_1$, $41d_2$ to pass test cells that have entered from devices in the SBY system and from devices in the OUS state. In other words, in the routing tables of the common shelf portions $41d_1$, $41d_2$, test cells from the ACT system are disabled and test cells from the SBY system are enabled.

Next, the network controller 61 commands the testing device 31 to start the test. In response to the command, the testing device 31 sends test cells to the ACT- and SBY-system ATM switches $21_{12}$, $21_{22}$ for the OUT direction. The ATM switches $21_{12}$, $21_{22}$ for the OUT direction route the respective test cells and transfer them to the respective SIF common shelf portions 41d-1, 41d-2. The SIF common shelf portions 41d-1, 41d-2 each branch their test cells in two directions so that the test cell from each common shelf portion enters the interfaces (ADSINF) $41c_1$, $41c_2$ of the ACT and SBY systems. Though the interfaces (ADSINF) $41c_1$, $41c_2$ discard the test cell from the SBY system, they accept and loop back the test cell from the ACT system and branch this cell in two directions so that the cell enters the common shelf portions $41d_1$, $41d_2$ of the ACT and SBY systems.

The gate 41d-2 (FIG. 7) in each of the common shelf portions $41d_1$, $41d_2$ of the ACT and SBY systems passes the test cells that have entered from the interfaces $41c_1$, $41c_2$. However, the VCCs 41d-4, 41d-5 to which the respective outputs of the gate 41d-2 are connected refer to their routing tables to disable the test cell from the ACT system, enable only the test cell form the SBY system, convert the VPI/VCI of the enabled test cell and add tag information to this cell. The resulting cell is inputted to the respective ATM switch. Specifically, the test cells from the common shelf portions $41d_1$, $41d_2$ enter the respective ATM switches $21_{11}$, $21_{21}$ for the IN direction. The ATM switches $21_{11}$, $21_{21}$ return their test cells to the testing device 31.

The testing device 31 compares the data contained in the test cell received from whichever system has been designated, e.g., the SBY system, with the data contained in the test cell that was transmitted to this system, decides whether the tested interface (ADSINF) $41c_2$ is normal or abnormal based upon whether comparison indicates agreement or non-agreement and notifies the network controller 61 of the decision.

(d-3) Testing of single equipment

Figure 14:
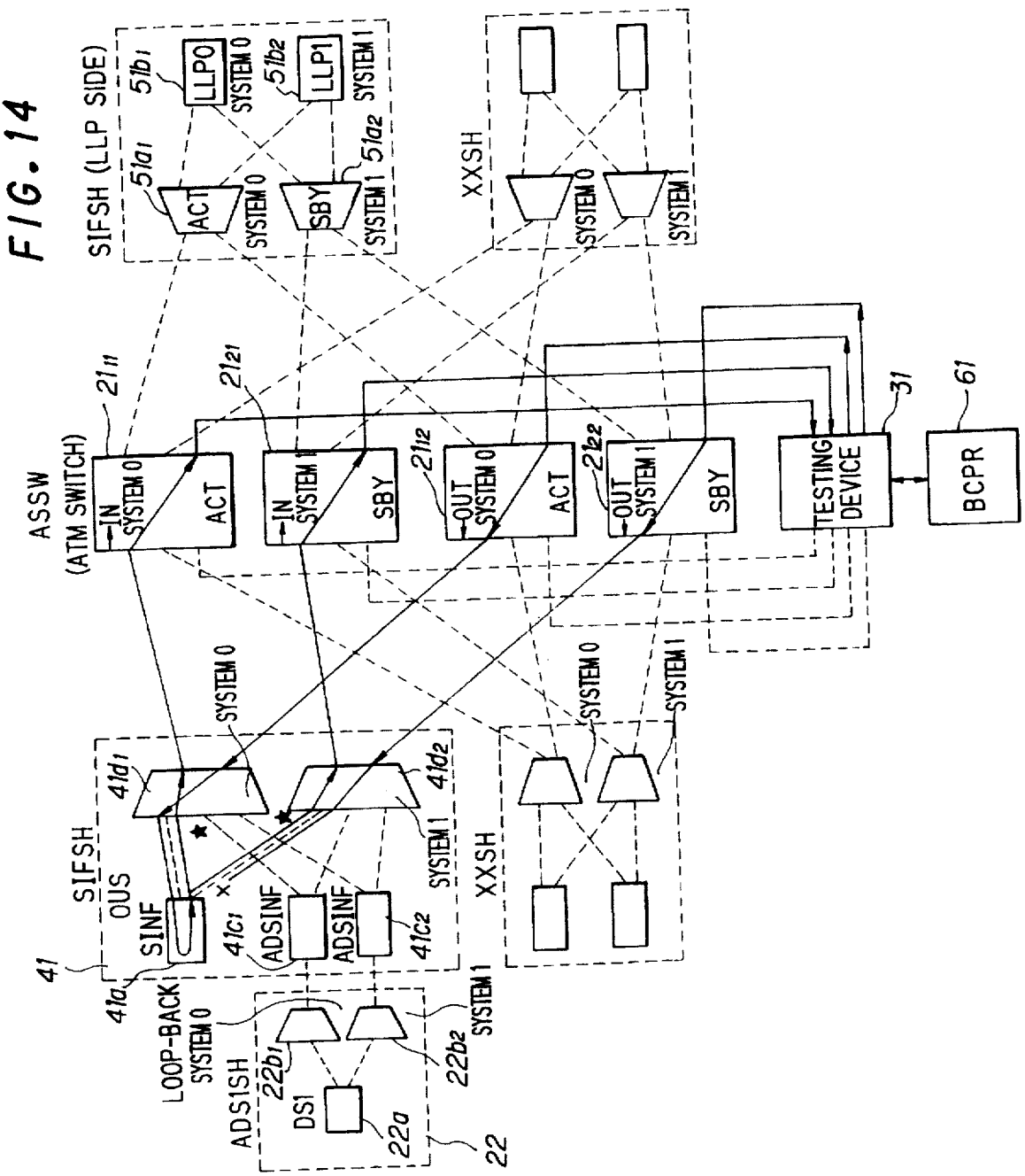
FIG. 14 is a diagram for describing the testing of an interface (SINF), which is provided in duplicate for redundancy.

FIG. 14 is a diagram for describing the testing of single (i.e., non-redundant) equipment, e.g., the interface (SINF) 41a. It will be assumed here that the ATM switches 21 and common shelf portions $41d_1$, $41d_2$ are normal.

When test parameters, a test command and data to be tested are entered from the maintenance console, the network controller 61 places the interface (SINF) 41a in the OUS state and sets this interface for loop-back. Further, the network controller 61 sets the common shelf portions $41d_1$, $41d_2$ to pass test cells even if the cells have entered from devices in the OUS state.

Next, the network controller 61 commands the testing device 31 to start the test. In response to the command, the testing device 31 sends test cells to the ACT- and SBY-system ATM switches $21_{12}$, $21_{22}$ for the OUT direction. The ATM switches $21_{12}$, $21_{22}$ for the OUT direction transfer the respective test cells to the respective SIF common shelf portions 41d-1, 41d-2. The SIF common shelf portions 41d-1, 41d-2 each input their test cells to the interface (SINF) 41a. Though the interface (SINF) 41a discards the test cell from the SBY system, it accepts and loops back the test cell from the ACT system and branches this cell in two directions so that the cell enters the common shelf portions $41d_1$, $41d_2$ of the ACT and SBY systems.

The gate 41d-1 (FIG. 7) in each of the common shelf portions $41d_1$, $41d_2$ of the ACT and SBY systems passes the test cell that has entered from the interface 41a in the OUS state. On the basis of the routing table, the VCC 41d-3 to which the output of the gate 41d-1 is connected replaces the VPI/VCI of the input test cell and adds on the tag information. The resulting cell is inputted to the respective ATM switch. Specifically, the test cells from the common shelf portions $41d_1$, $41d_2$ enter the respective ATM switches $21_{11}$, $21_{21}$ for the IN direction. As a result, the ATM switches $21_{11}$, $21_{21}$ return their test cells to the testing device 31.

The testing device 31 compares the data contained in the test cell received from whichever system has been designated, e.g., the SBY system, with the data contained in the test cell that was transmitted to this system, decides whether the tested interface (SINF) 41a is normal or abnormal based upon whether comparison indicates agreement or non-agreement and notifies the network controller 61 of the decision.

(d-4) Testing of line terminating circuit DS-1

Figure 15:
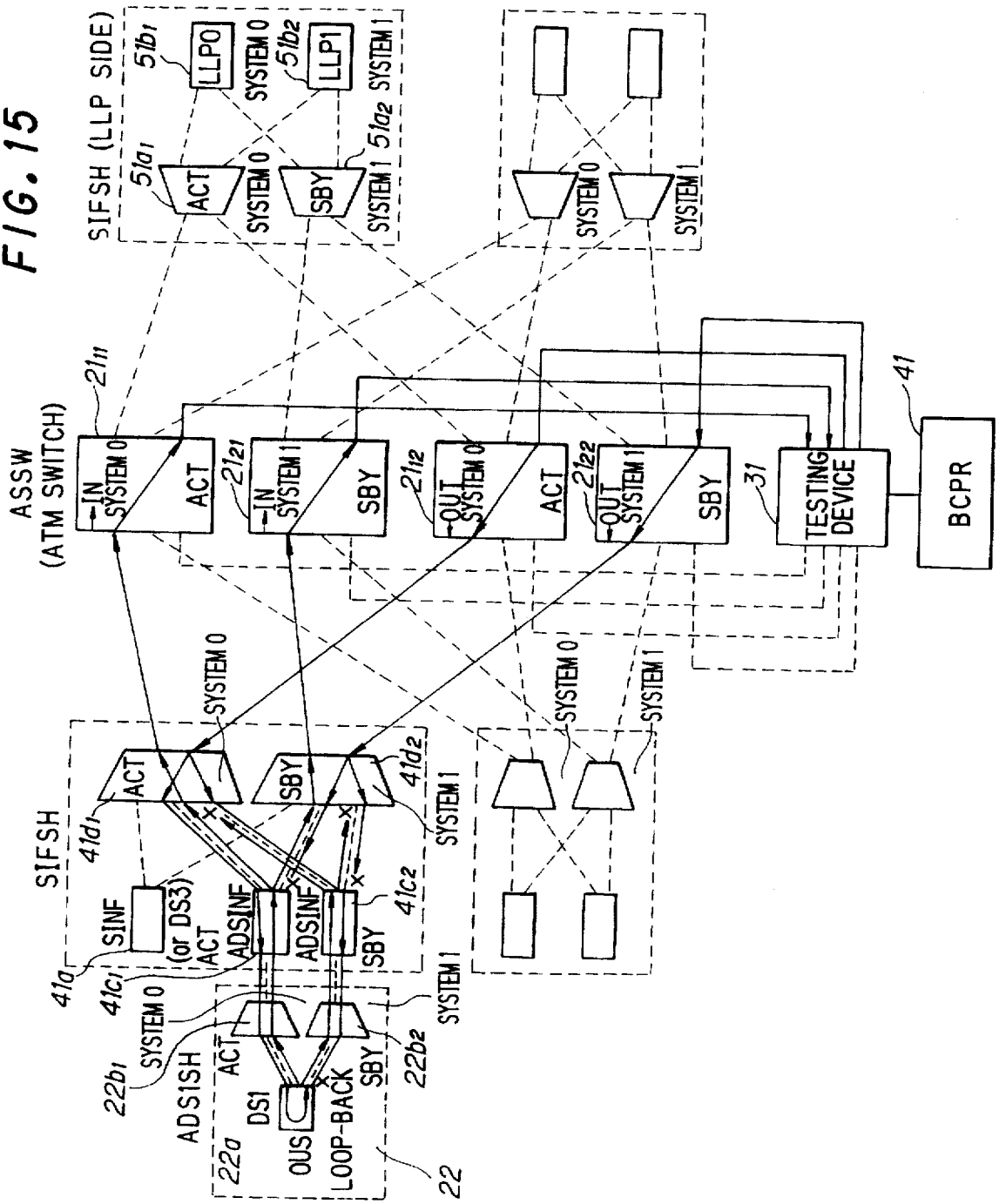
FIG. 15 is a block diagram illustrating a line terminating circuit (DS1)

FIG. 15 is a diagram for describing the testing of single (i.e., non-redundant) equipment, e.g., the line terminating circuit DS-1. It will be assumed here that the ATM switches 21, the common shelf portions $41d_1$, $41d_2$, the interfaces (ADSINF) 41c1, 41c2 and the common shelf portions $22b_1$, $22b_2$ are normal.

When test parameters, a test command and data to be tested are entered from the maintenance console, the network controller 61 places the line terminating circuit (DS-1)

22a in the OUS state and sets this circuit for loop-back. Further, the network controller 61 sets the common shelf portions $41d_1$, $41d_2$ to pass test cells even if the cells have entered from devices in the ACT system and devices in the OUS state. In other words, in the routing tables of the common shelf portions $41d_1$, $41d_2$, test cells from the SBY system are disabled and test cells from the ACT system are enabled.

Next, the network controller 61 commands the testing device 31 to start the test. In response to the command, the testing device 31 sends test cells to the ACT- and SBY-system ATM switches $21_{12}$, $21_{22}$ for the OUT direction. The ATM switches $21_{12}$, $21_{22}$ for the OUT direction transfer the test cells to the respective SIF common shelf portions $41d$-1, $41d$-2. The SIF common shelf portions $41d$-1, $41d$-2 each branch their test cells in two directions so that the test cell from each common shelf portion enters the interfaces (ADSINF) $41c_1$, $41c_2$ of the ACT and SBY systems. Though the interfaces (ADSINF) $41c_1$, $41c_2$ discard the test cell from the SBY system, they accept the test cell from the ACT system and input the cell to the line terminating circuit 22a via the interfaces $22b_1$, $22b_2$. The line terminating circuit 22a discards the test cell from the SBY system but accepts the test cell from the ACT system, loops back this test cell and branches it in two directions so that the cell enters the interfaces (ADSINF) $41c_1$, $41c_2$ via the common shelf portions $22b_1$, $22b_2$ of the ACT and SBY systems.

The interfaces (ADSINF) $41c_1$, $41c_2$ each branch the input test cell in two directions so that the cell from each interface enters both of the common shelf portions $41d_1$, $41d_2$ of the ACT and SBY systems. The gate $41d$-2 (FIG. 7) in each of the common shelf portions $41d_1$, $41d_2$ of the ACT and SBY systems passes the test cells that have entered from the interfaces $41c_1$, $41c_2$. However, the VCCs $41d$-4, $41d$-5 to which the respective outputs of the gate $41d$-2 are connected refer to their routing tables to disable the test cell from the SBY system, enable only the test cell form the ACT system, convert the VPI/VCI of the enabled test cell and add tag information to this cell. The resulting cell is inputted to the respective ATM switch. Specifically, the test cells from the common shelf portions $41d_1$, $41d_2$ enter the respective ATM switches $21_{11}$, $21_{21}$ for the IN direction. The ATM switches $21_{11}$, $21_{21}$ return their test cells to the testing device 31.

The testing device 31 compares the data contained in the test cell received from whichever system has been designated, e.g., the ACT system, with the data contained in the test cell that was transmitted to this system, decides whether the tested interface (DS-1) is normal or abnormal based upon whether comparison indicates agreement or non-agreement and notifies the network controller 61 of the decision.

(e) Control when failed system is tested

The foregoing relates to a case in which the ACT and SBY systems are tested for continuity by passing test cells through these systems. If a failure develops in one system, the failed system is placed in the OUS state and test cells are passed through this system in concentrated fashion. When such a concentrated test is carried out, a large quantity of test data flows also through the ACT system used by subscribers and therefore has a deleterious effect upon traffic. For this reason, there is need of a testing method that will not adversely affect traffic in the ACT (active) system when the failed system is tested.

Figure 16:
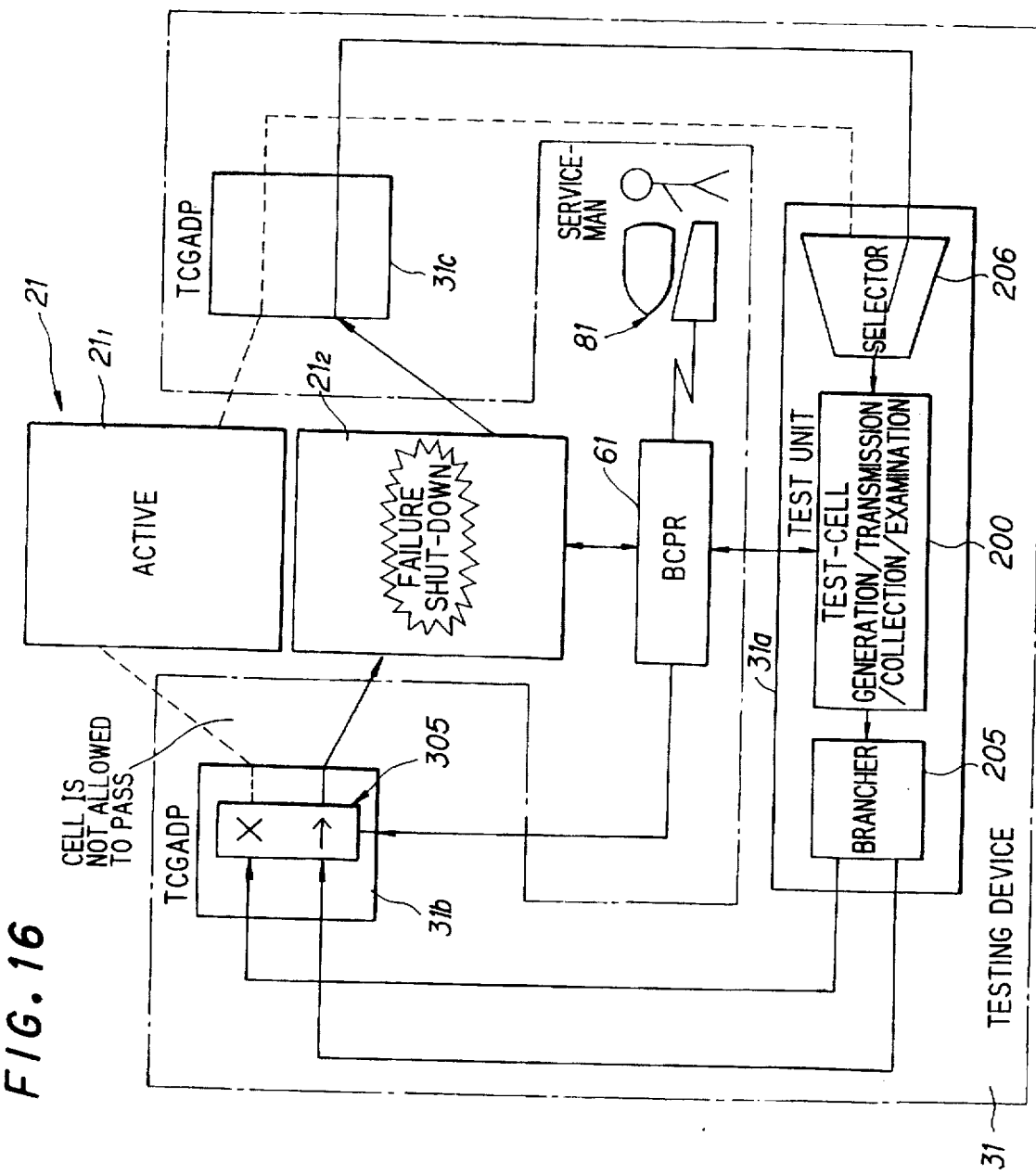
FIG. 16 is a diagram for describing the testing of a failed system.
Figure 17:
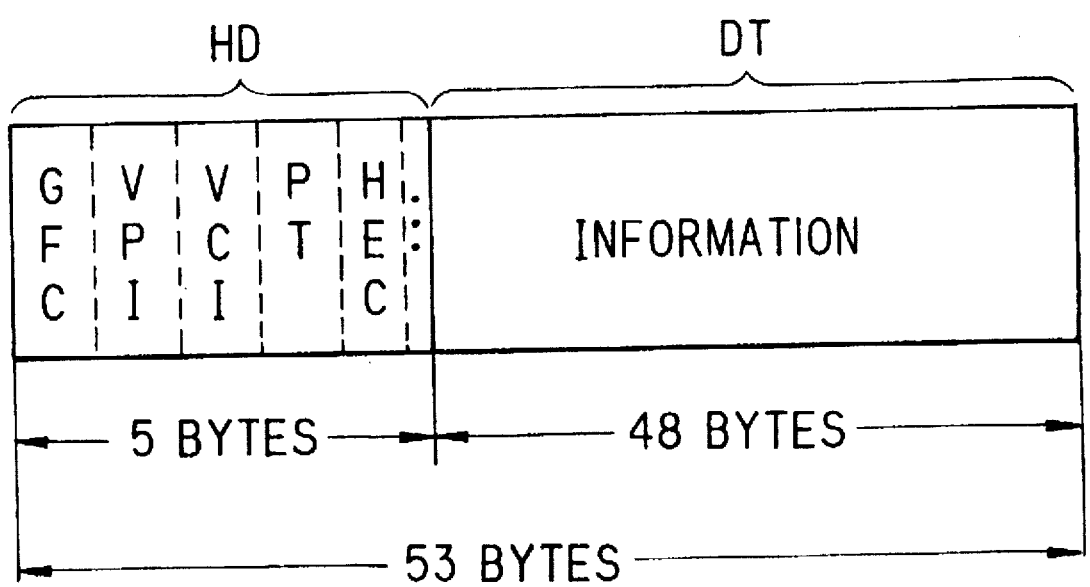
FIG. 17 is a diagram showing the composition of an ATM cell.
Figure 18:
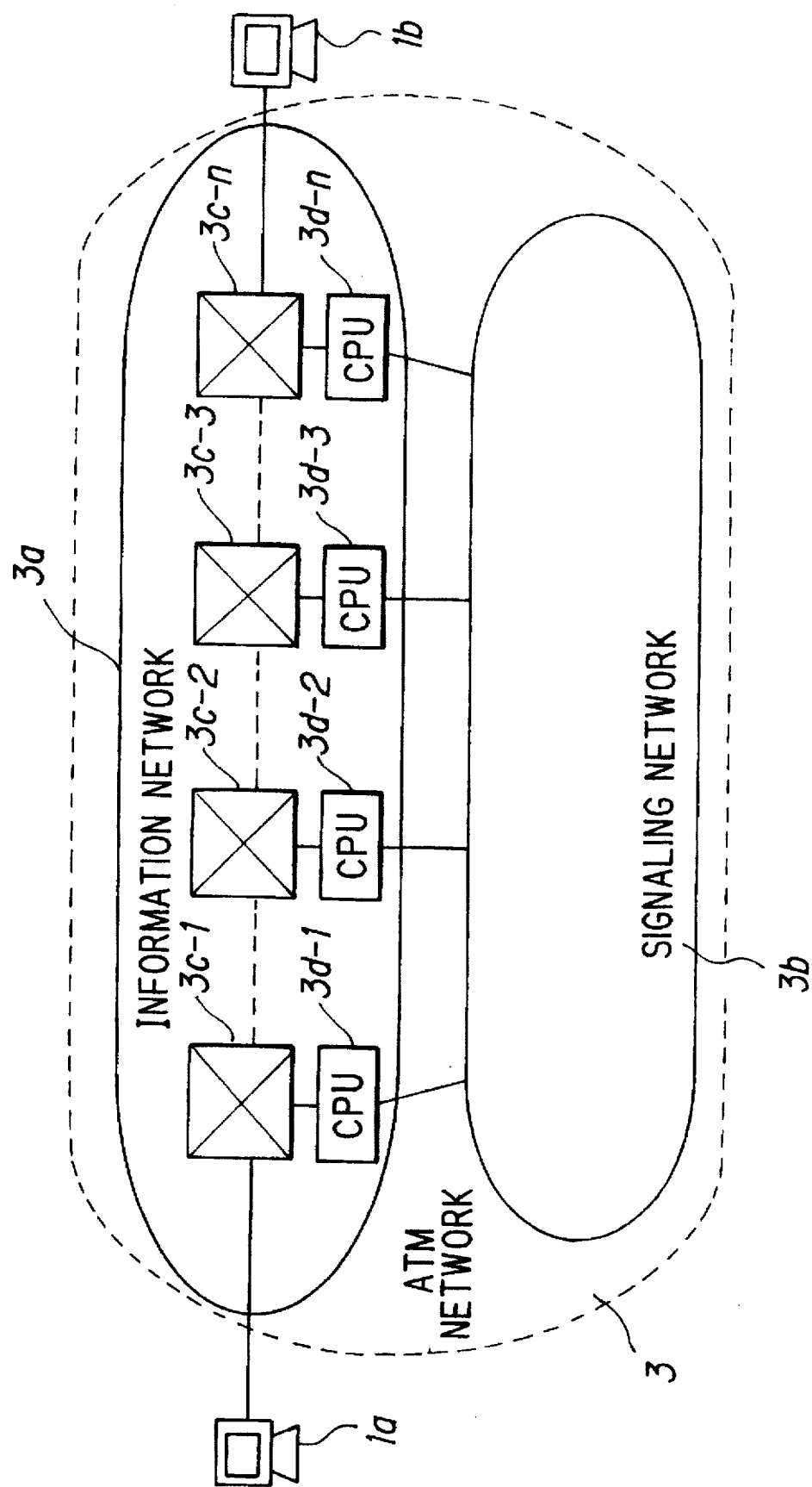
FIG. 18 is a diagram for describing the general features of an ATM network.
Figure 19:
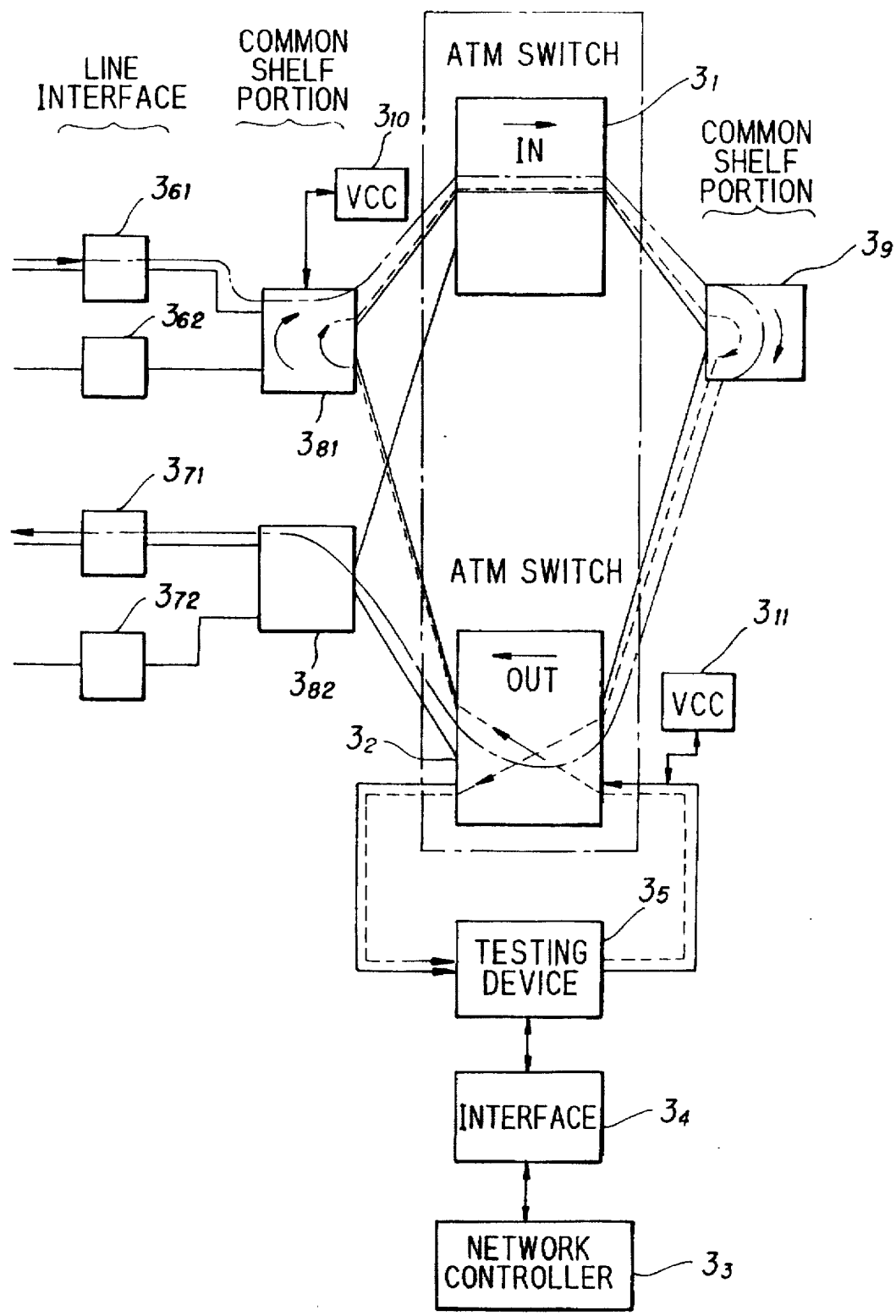
FIG. 19 is a diagram for describing the testing of an ATM exchange according to the prior art.
Figure 20:
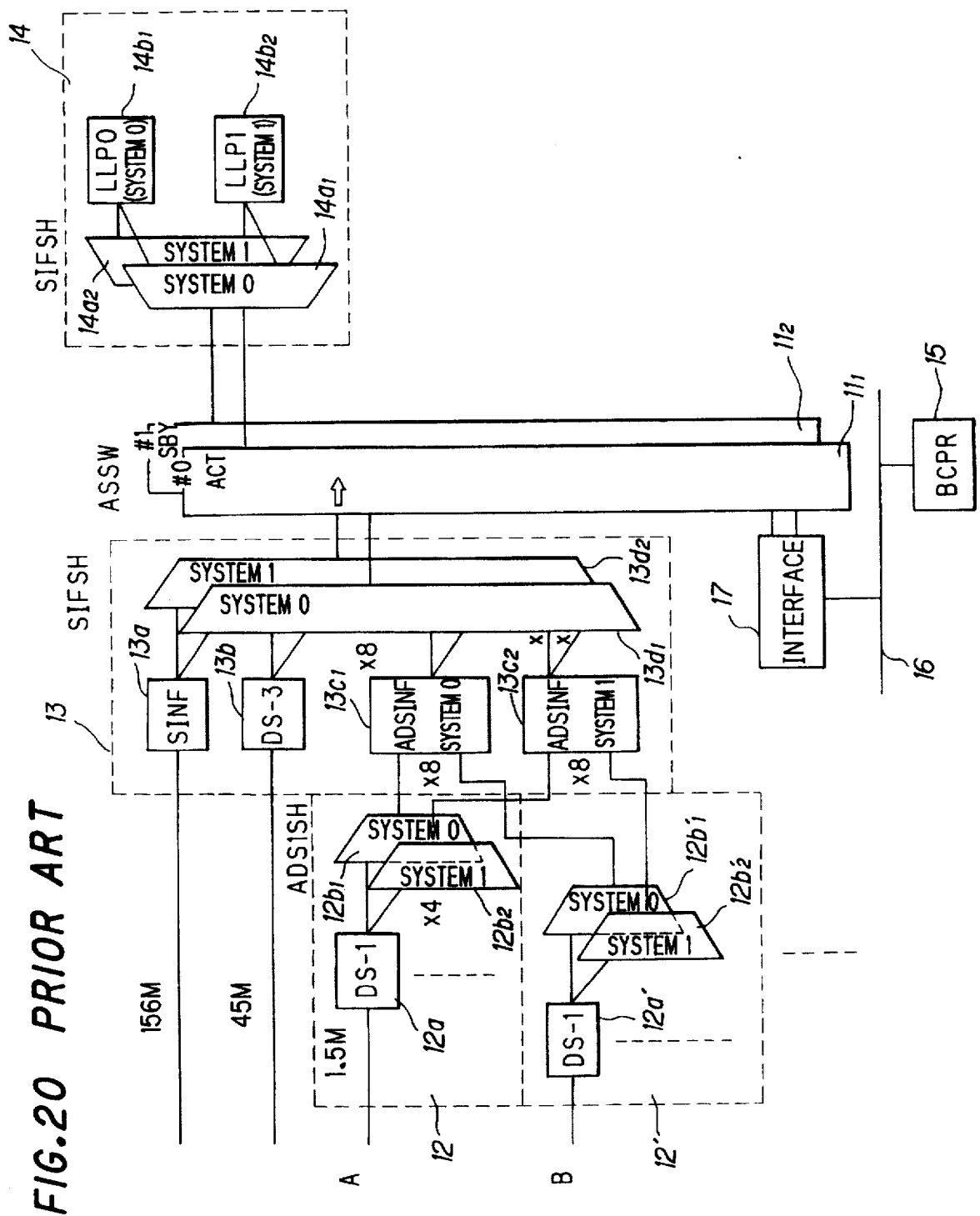
FIG. 20 is a diagram showing the construction of a redundant ATM exchange according to the prior art.
Figure 21:
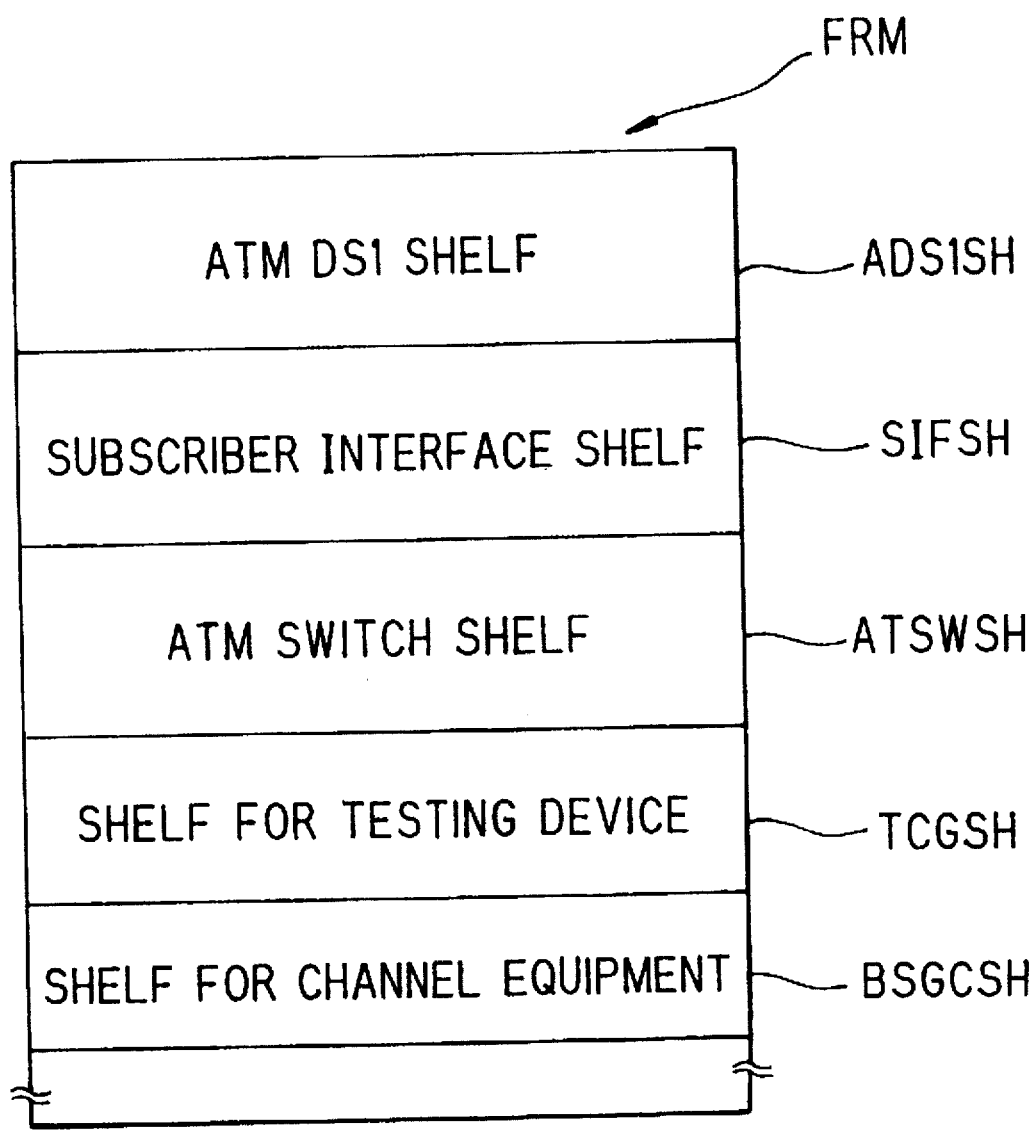
FIG. 21 is a diagram for describing the shelves of an ATM exchange.
Figure 22:
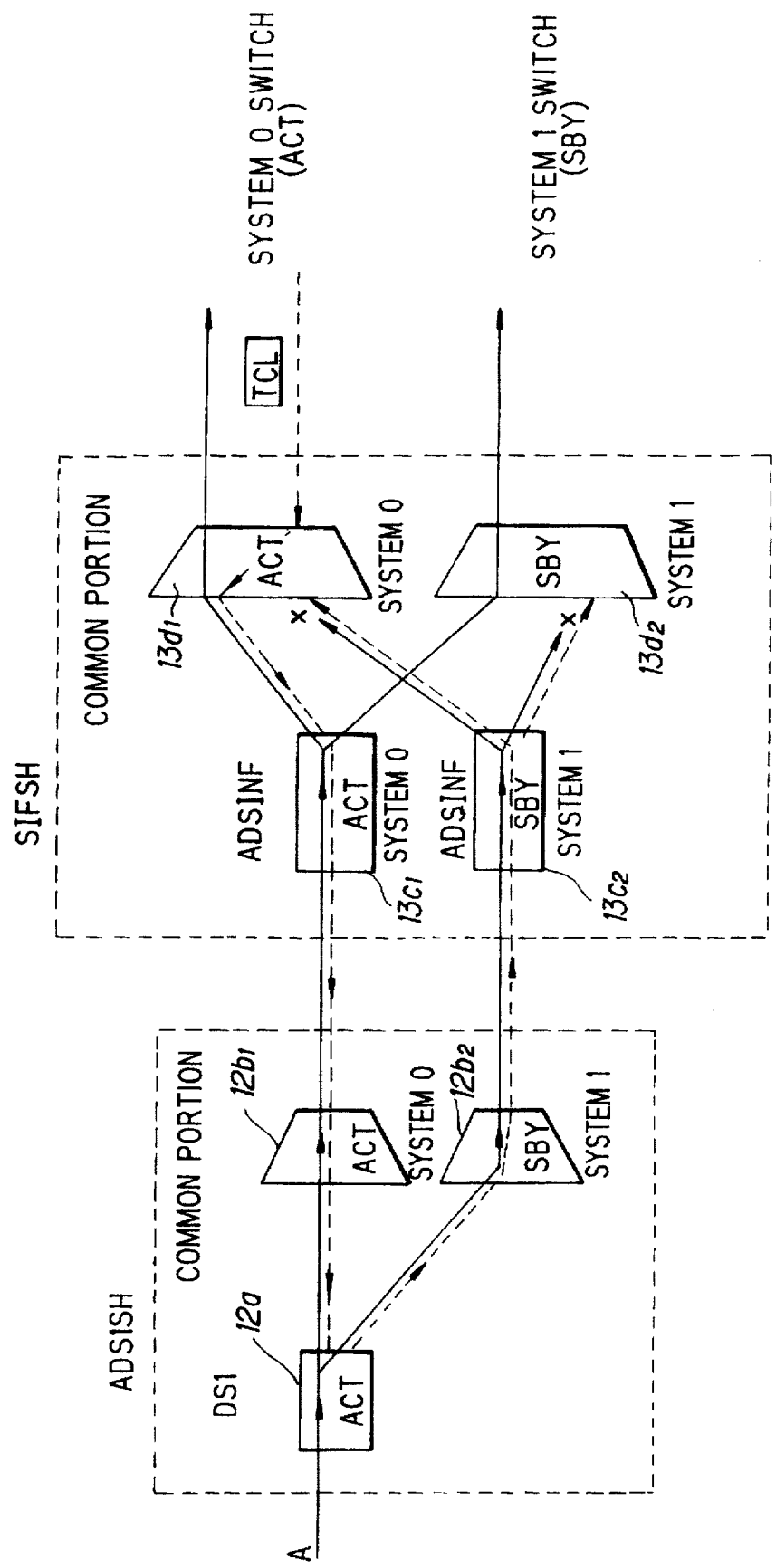
FIG. 22 is a diagram showing part of the construction of an ATM exchange useful in describing a situation in which an SBY device cannot be tested.
Figure 23:
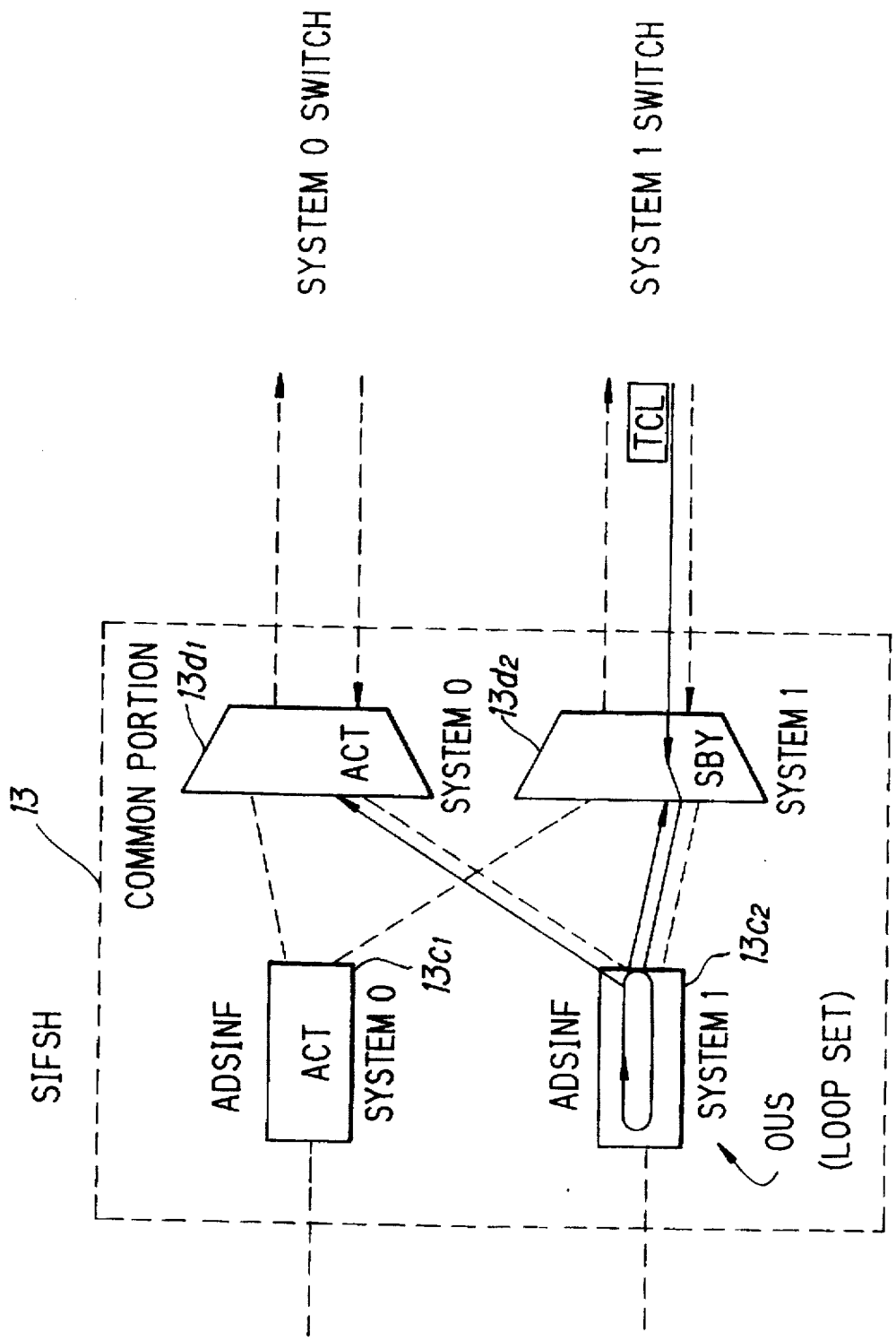
FIG. 23 is a diagram showing part of the construction of an ATM exchange useful in describing a situation in which a device in the OUS state cannot be tested.

FIG. 16 is a diagram for describing the testing of a failed system. Shown in FIG. 16 are the ATM switches 21, the testing device 31, the network controller (BCPR) 61 and a maintenance console 81. The testing device includes the test unit 31a as well as the first and second interfaces 31b, 31c. The test unit 31a includes a section 200 for generating, transmitting, collecting and examining test cells, a brancher 205 for branching a test cell in two directions and a selector 106 for selectively outputting a test cell that has traversed a designated system. The first interface 31b includes a data-transmission limiting circuit 305 that transmits a test cell, which has been generated by the test unit 31a, solely to the failed system. The first interface 31b and the second interface 31c are provided with the adapters (TCGADP) 301, 302 shown in FIG. 10 and the ATM interfaces 303, 403 for interfacing, with the ATM switches. These components, however, are not shown in FIG. 16.

When a serious failure occurs in one system of the ATM communication network, the entire system ($21_2$ in this case) is shut down and the system is tested by passing test cells from the testing device 31 through this system in concentrated fashion. In such case, traffic is adversely affected if the test cells are passed also through the active system being utilized by general subscribers. Accordingly, when the test parameters are set, the maintenance console 81 enters a command for subjecting the down system to a concentrated test. In response to this command, the network controller 61 performs a setting in such a manner that test cells will not flow into the active system at the time of the test. When this setting is made, the data-transmission limiting circuit 305 within the first interface 31b in the testing device 31 stops the transmission of test cells to the active system and transmits test cells solely to the down system. By virtue of this processing, the burden upon the active system can be eliminated.

If the system $21_2$ of the redundant ATM communication system develops a serious failure and is no longer capable of providing normal service, and if this system is the active system, then the SBY system $21_1$ is changed over and made the active system by the network controller 61 so that service may continue. Thereafter, the failed system is subjected to concentrated testing by the testing device 31.

First, using the maintenance console 81, the serviceman sends the network controller 61 a command for shutting down the failed system $21_2$. In response, the network controller 61 shuts down the failed network $21_2$. Next, using the maintenance console 81, the serviceman enters the VPI/VCI values for specifying the test route to be subjected to the continuity test, the contents of a test cell, whether the test is a concentrated test or an ordinary test, information indicating whether the system to be tested is the ACT system or the SBY system, the number of test cells to be generated, the rate of generation and a setting command.

The network controller 61 enters the input data and the command to the test unit 31a of the testing device 31 and, on the basis of whether the test is the concentrated test or the ordinary test and the information indicating whether the system to be tested is the ACT system or the SBY system, enters test-cell transmission limiting data to the data-transmission limiting circuit 305 of the first interface 31b. As a result, the data-transmission limiting circuit 305 performs gate control in such a manner that the test cell is passed through the failed system (the SBY system) $21_2$ only and not the active system $21_1$.

When the above-mentioned setting are concluded, the network controller 61 informs the maintenance console 81 of the fact that the setting command has been completed and the console responds by displaying the fact that the setting is complete. Next, the serviceman enters a test-execution command to start the test unit 31a of the testing device 31 via the network controller 61.

The test unit 31a branches the test cell in two directions and the cells enter the first interface 31b. The latter transmits the test cell solely to the failed system $21_2$. The test unit 31a collects the test cell, which has traversed the test route, via the second interface 31c, and examines the cell. When all of the generated test cells have been examined, the test unit 31a informs the maintenance console 81 of the end of the test via the network controller 61.

When the serviceman responds by entering a test-result notification command from the maintenance console 81, the network controller 61 transfers the test-result data of which it has been notified from the testing device 31 to the maintenance console and causes the data to be displayed on a display unit. It should be noted that the testing device 31 is capable of passing 12 types of test cell through the test route simultaneously to conduct testing. The serviceman may then execute the above-described test with regard to all questionable VPI/VCI and examine the details of failure.

If the above-described arrangement is adopted, the entirety of one system in which a serious failure has occurred is shut down, test cells are transmitted solely to the failed system and the test cells can be collected and examined. As a result, even when the failed system is tested by passing test cells through it in concentrated fashion, there is no adverse effect upon the traffic in the active system (the ACT system) utilized by an ordinary subscriber. This makes it possible to prevent a decline in service.

Further, if the test unit is provided with a redundant structure, as shown in FIG. 10, one test unit can test the failed system in a concentrated manner and the other test unit can test the active system by passing test cells through it to a degree that will not adversely affect traffic.

Thus, in accordance with the present invention as described above, a test cell is transmitted to both an active system and a standby system, the test cell is passed through ATM switches of both the active and standby systems by loop-back, the test cell that has passed through the ATM switches of both systems is received, and data contained in the transmitted test cell is compared with data contained in the test cell received from the active system or standby system, whereby a continuity test is conducted upon the ATM switches of the active and standby systems. As a result, a continuity test of both systems can be performed while the flow of test cells in the ACT and SBY systems is kept the same. Further, since the flow of test cells and user cells in both systems is the same, the standby system is made the active system immediately if the active system develops a failure during testing. This allows service to continue as well as the continuity test. Furthermore, by changing the VPI/VCI contained in the test cell, the loop-back route within ATM switches is changed over successively so that the ATM switches can be tested for continuity.

Further, in accordance with the invention, the arrangement is such that if the component to be tested is an intra-office unit other than an ATM switch, a test cell is transmitted to the side of the intra-office unit via the ATM switches of the ACT and SBY systems, the cell is looped back at a prescribed point so as to be passed through the unit undergoing the test, the test cell that has passed through tested unit is received via the ATM switches of the active and standby systems, and the data contained in the transmitted cell is compared with the data contained in the test cell received from the active system or standby system, thereby subjecting the aforementioned unit to the continuity test. In particular, according to the present invention, an arrangement is adopted in which a cell from an SBY device or a device in the OUS state is allowed to pass and return to the test unit without being blocked. As a result, units other than the ATM switches can be tested reliably.

Furthermore, in accordance with the present invention, a system that has failed is shut down, test cells are transmitted solely to the down system from the testing device in a concentrated manner, a cell returned upon passing through this system is received, and data contained in the transmitted test cell is compared with data contained in the received test cell, thereby subjecting the down system to a continuity test. As a result, a concentrated continuity test of a failed system can be performed without adversely affecting traffic in the active system.

Further, in accordance with the invention, an arrangement may be adopted in which two test units are provided, one being used for testing the continuity of the down system and the other being used for testing the continuity of the active system. As a result, the down system can be tested without adversely affecting the traffic in the active system. Moreover, the active system can be tested at the same time.

As many apparently widely different embodiments of the present invention can be made without departing from the spirit and scope thereof, it is to be understood that the invention is not limited to the specific embodiments thereof except as defined in the appended claims.

What is claimed is:

1. An exchange having a switch, a first interface circuit serving as an interface between data transmission line and the switch, and a second interface circuit provided between the switch and the first interface circuit comprising:

a control means for controlling said first and second interface circuits; and a test means for testing the first interface circuit by sending a fixed-length packet for test to the first interface circuit via the switch and the second interface circuit and receiving a returned test packet from the first interface circuit via the second interface circuit and the switch, wherein said second interface circuit including:

a means for judging, when a test packet is entered, whether the test packet is blocked or passed in accordance with control information sent from the control means; and means for selectively blocking or passing the test packet in accordance with the result of judgment and;

said first interface circuit including:

a means for judging, when a test packet is entered, whether the test packet is blocked or returned in accordance with control information sent from the control means; and means for selectively blocking or passing the test packet in accordance with the result of judgment.

2. An exchange according to claim 1, said second interface circuit further comprising:

a means for returning the test packet in accordance with the control information sent from the control means, wherein the test means sends a test packet to the second interface circuit via the switch, the second interface circuit returns the test packet to the test means via the switch in accordance with the control information sent from the control means and the test means tests the second interface circuit based upon the returned test packet.

3. An exchange according to claim 1, said exchange further comprising:

a looping back means provided between the switch and the second interface circuit, wherein said looping back means includes:

a means for judging, when a test packet is entered, whether the test packet is looped back or passed in accordance with control information sent from the control means;

means for selectively looping back or passing the test packet in accordance with the result of judgement; and wherein the test means sends a test packet to the looping back means via the switch, the looping back means looping back the test packet to the test means via the switch in accordance with the control information sent from the control means and the test means tests the switch based upon the returned test packet.

* * * * *